United States Patent
Holt et al.

(10) Patent No.: US 10,894,332 B2
(45) Date of Patent: Jan. 19, 2021

(54) SYSTEMS AND METHODS FOR MINIMIZING A TOTAL NUMBER OF CUTS TO SEPARATE MEDIA INSTANCES IMAGED ONTO A MEDIA SHEET

(71) Applicant: ELECTRONICS FOR IMAGING, INC., Fremont, CA (US)

(72) Inventors: Rohan John Holt, Edmonds, WA (US); James Michael McBride, Vashon, WA (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 15/831,037

(22) Filed: Dec. 4, 2017

(65) Prior Publication Data

US 2018/0085962 A1   Mar. 29, 2018

Related U.S. Application Data

(62) Division of application No. 13/715,569, filed on Dec. 14, 2012, now Pat. No. 9,833,921.

(60) Provisional application No. 61/570,345, filed on Dec. 14, 2011.

(51) Int. Cl.
*B26D 3/00* (2006.01)
*G06Q 10/04* (2012.01)

(52) U.S. Cl.
CPC ............. *B26D 3/00* (2013.01); *G06Q 10/043* (2013.01); *Y10T 83/0524* (2015.04)

(58) Field of Classification Search
CPC ...... B26D 3/00; G06Q 10/043; Y10T 83/0524
USPC .......... 83/39, 76.1–76.9; 700/171, 173, 117, 700/159, 167; 702/14
See application file for complete search history.

(56) References Cited

U.S. PATENT DOCUMENTS

| | | | |
|---|---|---|---|
| 4,017,976 A | 4/1977 | Barr et al. | |
| 4,445,776 A | 5/1984 | Hyatt | |
| 4,554,635 A | 11/1985 | Levine | |
| 5,825,652 A | 10/1998 | LeBlond et al. | |

(Continued)

FOREIGN PATENT DOCUMENTS

| WO | WO-2004102430 A1 * | 11/2004 | ......... B23D 36/0091 |
|---|---|---|---|
| WO | 2012057797 | 5/2012 | |
| WO | WO-2012057797 A1 * | 5/2012 | ........... G06F 3/1204 |

OTHER PUBLICATIONS

Avelos, F. R., et al., "Sequence Based Heuristics for Two-Dimensional Bin Packing Problems", peer-00545363, v. 1; Dec. 10, 2010; (Author manuscript, published in Engineering Optimization vol. 41. No. 8, 2009, pp. 773-791); p. 4 lines 29-30, figures 1 to 6 and figures 8 to 9 in particular., 773-791.

(Continued)

*Primary Examiner* — Ghassem Alie
*Assistant Examiner* — Bharat C Patel
(74) *Attorney, Agent, or Firm* — Perkins Coie LLP

(57) ABSTRACT

A system and method utilizes strategies, priority rules, specifications, and comparisons to calculate the fewest number of cuts to separate individual instances from an imaged media sheet. Embodiments of the systems and methods may produce an optimal or more efficient arrangement of the media instances on an imaged media to minimize a total number of cuts to separate the instances, and thus reduce an overall cost.

13 Claims, 17 Drawing Sheets

(56) References Cited

U.S. PATENT DOCUMENTS

| | | | |
|---|---|---|---|
| 6,314,334 B1* | 11/2001 | Berlin | G06Q 10/043 700/134 |
| 6,314,335 B1 | 11/2001 | Sainen et al. | |
| 6,690,990 B1* | 2/2004 | Caron | B27G 1/00 144/363 |
| 6,731,393 B1 | 5/2004 | Kerr et al. | |
| 6,879,873 B2 | 4/2005 | Passant et al. | |
| 7,133,149 B2 | 11/2006 | Keane et al. | |
| 7,573,486 B2 | 8/2009 | Mondry et al. | |
| 7,782,488 B2* | 8/2010 | Saito | G06F 3/1208 358/1.9 |
| 7,841,265 B2 | 11/2010 | Werner et al. | |
| 7,967,517 B2* | 6/2011 | Wada | B26D 5/005 399/384 |
| 8,010,216 B2* | 8/2011 | Roise | G06Q 10/06 700/100 |
| 8,244,394 B2* | 8/2012 | Nagy | C03B 27/00 700/157 |
| 8,345,303 B2* | 1/2013 | Yoshimoto | H04N 1/0035 358/1.15 |
| 8,428,767 B2* | 4/2013 | Tremoureux | B26D 5/00 700/134 |
| 8,655,477 B2 | 2/2014 | Wirsam et al. | |
| 8,947,451 B2* | 2/2015 | Mondry | G06T 11/60 345/619 |
| 9,049,419 B2* | 6/2015 | Cheatle | G06T 11/60 |
| 9,833,921 B2* | 12/2017 | Holt | B26D 3/00 |
| 2002/0026379 A1 | 2/2002 | Chiarabini et al. | |
| 2002/0040375 A1* | 4/2002 | Simon | G06T 11/60 715/251 |
| 2005/0168775 A1 | 8/2005 | Liu | |
| 2006/0191426 A1 | 8/2006 | Timmerman et al. | |
| 2006/0290986 A1* | 12/2006 | Liu | H04N 1/00132 358/1.18 |
| 2000/7025302 | 11/2007 | Yamaguchi | |
| 2007/0253029 A1* | 11/2007 | Yamaguchi | G06F 17/217 358/1.18 |
| 2007/0265664 A1 | 11/2007 | Gerber et al. | |
| 2008/0123138 A1* | 5/2008 | Banerjee | H04N 1/00132 358/1.18 |
| 2008/0266606 A1* | 10/2008 | Huenemann | G06F 17/211 358/1.18 |
| 2008/0288100 A1* | 11/2008 | Moisio | D21G 9/0009 700/127 |
| 2009/0043628 A1 | 2/2009 | Gombert | |
| 2009/0056583 A1* | 3/2009 | Matsuhashi | B41J 3/4075 101/485 |
| 2009/0059298 A1* | 3/2009 | Huenemann | G06T 11/60 358/1.18 |
| 2009/0213428 A1* | 8/2009 | Klippenstein | G06T 11/60 358/1.18 |
| 2010/0199173 A1* | 8/2010 | Morooka | G06F 3/1208 715/246 |
| 2010/0315659 A1* | 12/2010 | Tatsuno | G06F 3/1204 358/1.5 |
| 2010/0319506 A1 | 12/2010 | Weder et al. | |
| 2011/0147445 A1 | 6/2011 | Horn et al. | |
| 2013/0215471 A1 | 8/2013 | Banner et al. | |

OTHER PUBLICATIONS

Christofides, N., et al., "An Algorithm for Two-Dimensional Cutting Problems", Operation Research, v. 25, No. 1, 1977, pp. 30-44. Sections 1 to 2 (on pp. 32 to 37) and figure 4 in particular., 30-44.

* cited by examiner

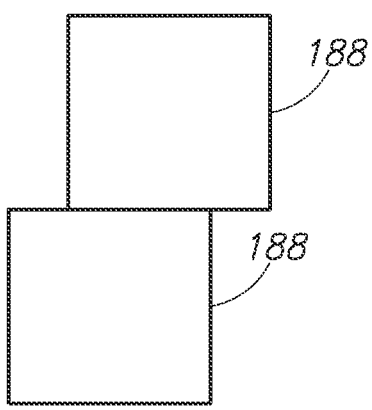
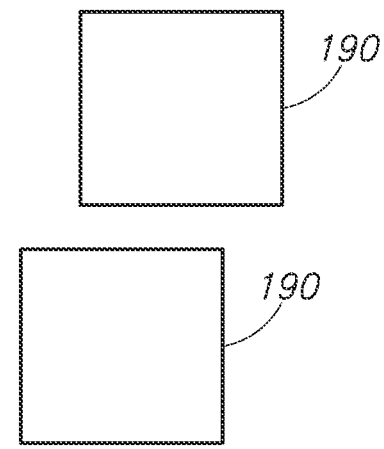
FIG.15      FIG.16
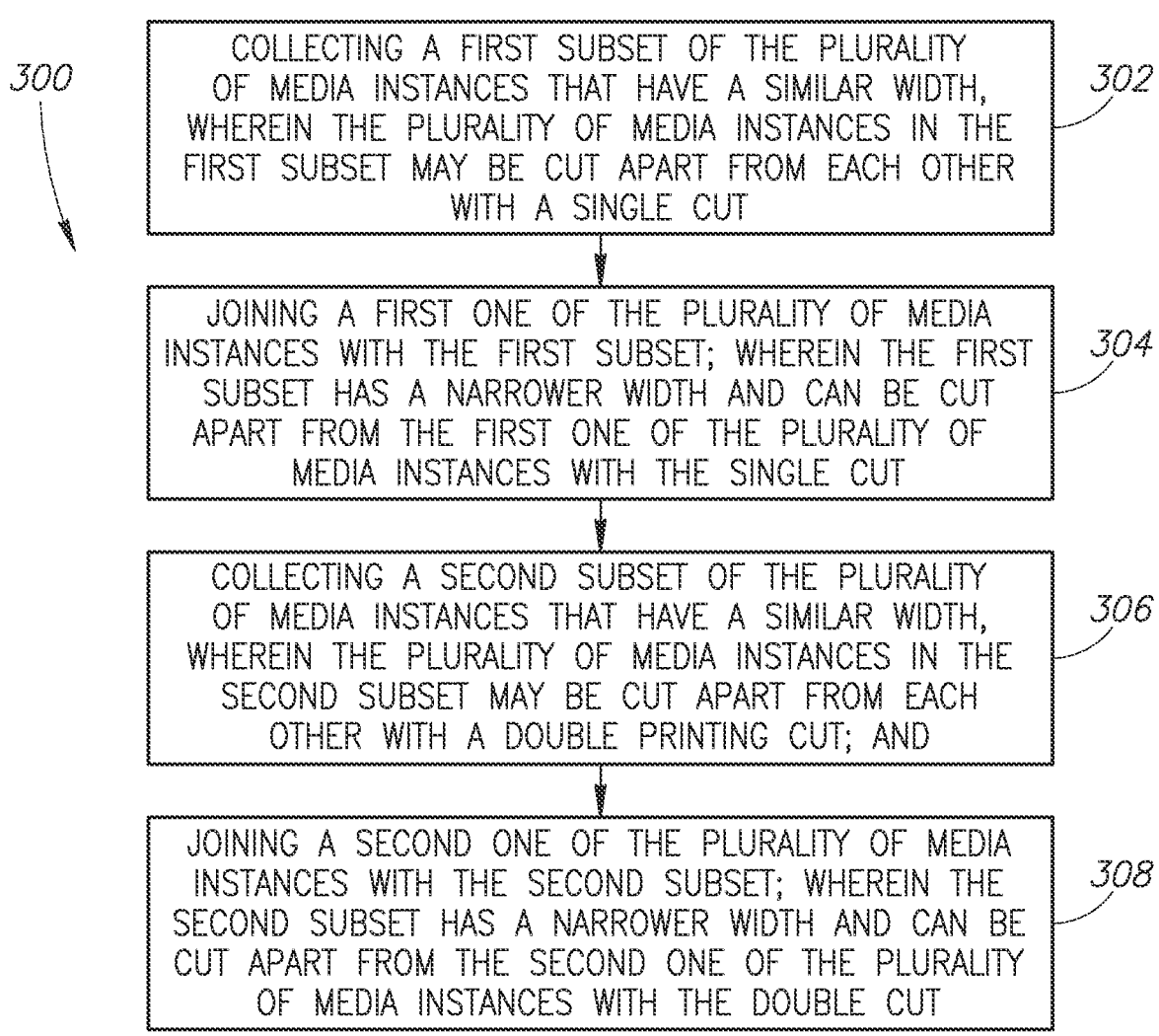
FIG.17

SYSTEMS AND METHODS FOR MINIMIZING A TOTAL NUMBER OF CUTS TO SEPARATE MEDIA INSTANCES IMAGED ONTO A MEDIA SHEET

CROSS-REFERENCE TO RELATED APPLICATIONS

The present application is a divisional of U.S. patent application Ser. No. 13/715,569, filed Dec. 14, 2012, now U.S. Pat. No. 9,833,921, which claims priority to U.S. Provisional Application No. 61/570,345, filed Dec. 14, 2011, each of which is incorporated herein by reference in its entirety.

COPYRIGHT NOTICE

This disclosure is protected under United States and International Copyright Laws. ©2012 Outback Software, Pty, Ltd. All Rights Reserved. A portion of the disclosure of this patent document contains material which is subject to copyright protection. The copyright owner has no objection to the facsimile reproduction by anyone of the patent document or the patent disclosure after formal publication by the USPTO, as it appears in the Patent and Trademark Office patent file or records, but otherwise reserves all copyright rights whatsoever.

SUMMARY

The invention generally relates to systems and methods that utilize computer-readable instructions for determining a minimum number of cuts required to cut a media sheet having pre-arranged, imaged media instances. One environment where the invention may be employed is the commercial printing industry. By way of example, the production of commercially imaged media sheets may include more than one media instance of a product, or more than one product, that can be positioned on the media sheet (e.g., paper). Before imaging, the instances may be displayed in a layout, which may take the form of a virtual depiction or representation of the instances selectively arranged using some combination of the computer-readable instructions that may include strategies, rules, specifications, tests, and/or priorities. A finalized and approved layout would eventually take the physical form of the media sheet during the printing process.

In one aspect of the present invention, a computer-implemented method to determine a number of cuts for a fixed layout includes the steps of (1) identifying a particular media instance; (2) determining a cutting relationship of the particular media instance relative to a plurality of neighboring media instances of the instance. Determining the cutting relationship includes the sub-steps of (A) determining a cut type for each edge of the particular media instance; (B) determining a relative width of the particular media instance and the relative widths of the plurality of neighboring media instances; and (C) determining a cut alignment. For the particular media instance, step (3) includes prioritizing the plurality of neighboring media instances based on a set of priorities that evaluate relative widths of the plurality of neighboring media instances; and the final step (4); for the particular media instance, includes joining the plurality of neighboring media instances into strips that require the fewest cuts to separate.

In another aspect of the present invention, a computer-implemented method to optimize a printing layout to minimize a number of cuts for a plurality of media instances includes the steps of (1) collecting a first subset of the plurality of media instances that have a similar width, wherein the plurality of media instances in the first subset may be cut apart from each other with a single cut; (2) joining a first one of the plurality of media instances with the first subset; wherein the first subset has a narrower width and can be cut apart from the first one of the plurality of media instances with the single cut; (3) collecting a second subset of the plurality of media instances that have a similar width, wherein the plurality of media instances in the second subset may be cut apart from each other with a double cut; and (4) joining a second one of the plurality of media instances with the second subset; wherein the second subset has a narrower width and can be cut apart from the second one of the plurality of media instances with the double cut.

BRIEF DESCRIPTION OF THE DRAWINGS

In the drawings, identical reference numbers identify similar elements or acts. The sizes and relative positions of elements in the drawings may not be necessarily drawn to scale. For example, the shapes of various elements and angles may not be drawn to scale, and some of these elements may be arbitrarily enlarged or positioned to improve drawing legibility. The sizes and relative positions of elements are only representative examples of a larger variety of possible sizes and positions.

FIG. 15 is a top, plan view of a neighboring instances that are not aligned on either edge that may be separated by a single cut according to an embodiment of the present invention;

FIG. 16 is a top, plan view of a neighboring instances that are not aligned on either edge that may be separated by a double cut according to an embodiment of the present invention;

FIG. 17 is a flowchart of a decision process for optimizing a printing layout to minimize a number of cuts for a plurality of media instances according to an embodiment of the present invention;

DETAILED DESCRIPTION

Figure 1:
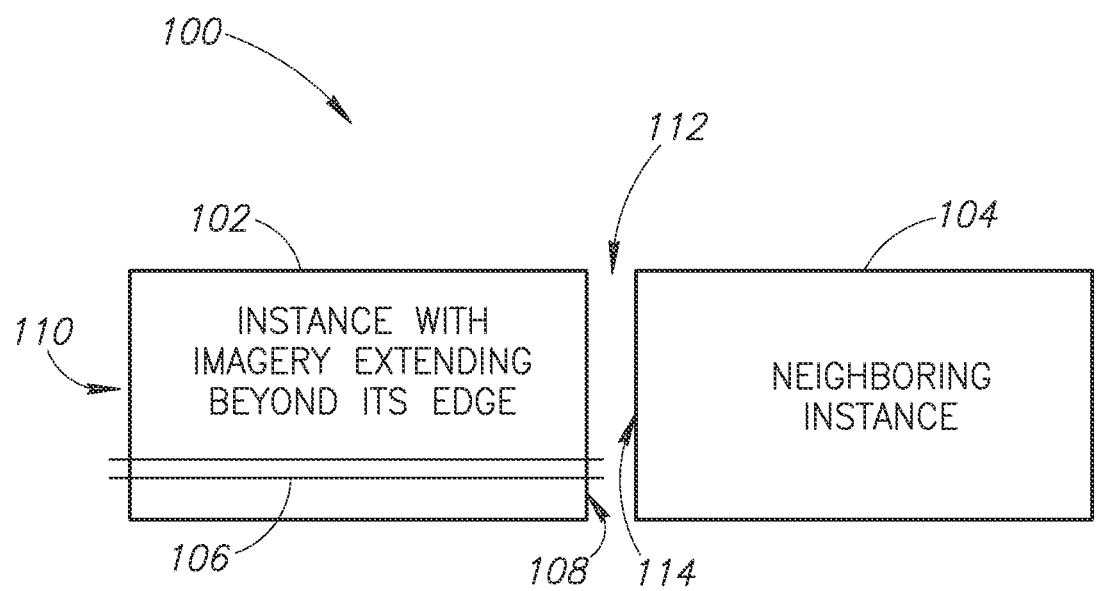
FIG. 1 is a top, plan view of a media sheet having a first instance with extended imagery according to an embodiment of the present invention.

Embodiments of the invention may be operational with numerous general purpose or special purpose computing system environments or configurations. Examples of well known computing systems, environments, and/or configurations that may be suitable for use with the invention include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention generally relates to computer-readable instructions and methods for determining a minimum number of cuts required to cut a media sheet having a plurality of pre-arranged, imaged "instances" (an individual product or image). In the commercial printing industry, the production of commercially imaged media sheets may include more than one media instance of a product, or more than one product, that can be positioned on the media sheet. Before imaging, the instances may be displayed in a layout, which for purposes of this description means a virtual depiction of a number of media instances arranged using some combination of computer-readable instructions that may include strategies, rules, specifications, tests, and/or priorities. A finalized and approved layout would eventually take the physical form of the media sheet. In turn, the media sheet is the physical print stock material after instances have been imaged onto the blank print stock pursuant to a finalized and approved layout. And the print stock is the printing medium to be used in the commercial printing process (generally paper, but may be other non-paper materials). After imaging, the individual instances are typically cut apart into to individual products (e.g., a stack of business cards for company A and a stack of business cards for company B) by a "guillotine cutting" process. The cost to operate the cutting machine may be compiled and analyzed to understand a cost per cut ratio for a particular layout.

Thus, one objective of the present invention includes computer software that determines a minimal number of cuts for a pre-arranged layout while another objective determines an optimal layout that results in a minimal number of cuts. For purposes of the present description, the term "pre-arranged" means that the individual instances are already arranged in a particular manner, but such an arrangement may not necessarily be an optimal arrangement. Another embodiment of the present invention generally relates to generating an optimal layout of instances in a manner that will result in the most efficient method of cutting the media sheet into individual instances to minimize the number of cuts. An objective of both embodiments is to employ a variety of strategies, rules, specifications, tests, and/or priorities to calculate a fewest number of cuts to separate individual media instances in an attempt to minimize the number of physical cuts, which may minimize the overall cutting costs.

The embodiments of the present invention may advantageously reduce or eliminate the complexities of gang printing and minimize stock waste by placing as many media instances on a media sheet as possible. Moreover, the embodiments of the present invention may also consider printer/press capabilities and product specifications such as grain direction. By way of example, the systems, software modules and methods described herein may operate to automatically and dynamically determine how many media sheets are needed, an optimum layout for each media sheet, and a cost-effective printing method, press, and media sheet size.

In general, the fewer cuts made to a media sheet the better because cutting takes time, and more time equates to increased costs in the printing process. The exact cost of cutting is dependent upon several factors such as the cost and capabilities of the specific equipment (and possibly human operator) that will perform cutting. The factors can include such things as the quantity of sheets that can be cut simultaneously, the total number of sheets to cut, the speed of setting up the cutter for this layout, the speed of getting material into the cutter to cut, and the speed of getting cut instances out of the cutter and passed along to the next stage of their handling. In view of these variables, the cost of cutting is directly dependent on the number of cuts that actually have to be made. To reiterate, an object of the present invention is to determine the minimum required number of cuts to physically separate all media instances on the media sheet.

In one embodiment, the systems and methods determine the number of cuts required for any unique layout of instances that are to be imaged onto the media sheet. This information may be dynamically calculated whenever something changes on a layout. In addition, this information may be provided to customer or potential customer for guidance on cutting costs related to their media. This information may also be used with other information as criteria for ranking the overall production cost for a given layout configuration. By way of example, at least one embodiment of the present invention determines a list of proposed cut lines, which may be specified by end points, relative to the media sheet. These proposed cut lines may be displayed with the layout, for example overlaid onto the layout, to diagrammatically justify the validity of the proposed cuts. In one embodiment, the layout and cut lines may be displayed in an animated movie on a display screen that will highlight each cut on relative to all of the instances arranged in the layout.

For the purposes of the present description, the term "INSTANCE" shall include a single occurrence of an imaged item on a media sheet that needs to be separated from a neighboring instance by cutting. The term "IMAGED," "IMAGE" or "IMAGERY" should be broadly interpreted to include printed subject matter, photographs, and any other media that is intended to be reproduced or otherwise applied onto a tangible medium. Additional processing may be required to convert the cut instance into a finished product. The term "PRINT STOCK" includes the printing medium to be used in the commercial printing process (generally paper, but may be other non-paper materials). Accordingly, blank print stock is the print stock prior to any type of image (printed matter, designs, photographs, etc.) being applied. The term "MEDIA SHEET" includes the physical print stock material after instances have been imaged onto the blank print stock pursuant to a finalized and approved layout. The media sheet may include multiple identical media sheets that form a stack. The term "LAYOUT" includes a virtual depiction of a number of media instances arranged using some combination of computer-readable instructions that may include strategies, rules, specifications, tests, and/or priorities. A finalized and approved layout would eventually take the physical form of a media sheet. The layout may provide a description and/or display of the geometry, location, size and orientation of one or more instances that may eventually be applied to the media sheet.

The term "CUT" includes a straight line that divides the media into two media sheets while physically separating at least two instances applied to the respective two media sheets. By way of example, the cut may separate a stack of identical media sheets each into two stacks of media sheets, whereby each stack includes identical media sheets within the respective stack. The term "SINGLE CUT" includes neighboring instances that share a common border, and can therefore be cut using a single cut that touches the abutted edges of the neighboring instances on either side of the single cut. The term "DOUBLE CUT" includes neighboring instances that have a gap between them, and therefore require two cuts (one for each edge of each instance) to separate them. By way of example, a double cut is commonly required for instances that have imagery extending beyond the edge of the instance. Additional description and illustration of single and double cuts will be provided below.

The term "TRIMMING" includes a cutting process that removes undesired scrap media from an instance to ensure that the instance is the final size of the desired product. Trimming may be a natural byproduct of other cuts, or may require an additional cut to remove excess blank print stock from one or more instances. The term "BINDERY-TRIMMING" includes a separate process that only occurs to instances that are bound. Bindery-trimming is process that is integrated into a binding operation, and is unrelated to trimming as an aspect of the cutting process as just described above. The term "CUT PLAN" includes a planned sequence of cuts and trimming that divide the media sheet into customer-deliverable media instances.

The term "SUB-STRIP" includes an instance or another sub-strip joined with one or more sub-strips to construct a new strip. A sub-strip may be a single instance, or may itself be a strip. This will be explained in more detail below. The term "STRIP" includes a collection of neighboring instances and/or sub-strips that either take the form of a column strip or a row strip. The column strip is one sub-strip wide by one or more sub-strips tall. The sub-strips in a column strip would share a common left and right edge. By way of example, the column strip may also be referred to as a "1×N" strip. The row strip is one sub-strip tall by one or more sub-strips wide. The sub-strips in a row strip would share a common top and bottom edge. By way of example, the row strip may be referred to as an "M×1" strip. Finally, the term "ALIGNED EDGES" refers to edges of two instances that both on the same straight line.

During a printing process in which multiple instances are on the media sheet, each cutting decision may impact the next cutting decision, and so on. In the aggregate, the time, and thus cost, of these cutting decisions may significantly impact the final price paid by a customer. FIG. 1 shows a media sheet 100 having a first instance 102 and a neighboring instance 104. In the illustrated embodiment the instances 102, 104 may take the form of business cards each having different information. The first instance 102 includes imagery 106 (shown as horizontal lines) that extend beyond a right edge 108 of the first instance 102. Due to mechanical inaccuracies in the cutting process, the imagery 106 may have to be imaged beyond the right cut edge 108 of the instance 102, and even possibly extend beyond a left cut edge 110 of the instance 102, to guarantee that the imagery 106 still extends to each of the cut edges 108, 110 after cutting. Generally, there are two conflicting concerns when imaging beyond the cut edges 108, 110 of the instance 102. First, the imaging must guarantee that the imagery 106 touches both edges 108, 110 of the instance 102. Second, the imaging must guarantee that the imagery 106 does not overlap or intrude on the neighboring instance 104. To balance these conflicting concerns, the media sheet 100 may include a gap 112 between the first instance 102 and the neighboring instance 104. Instances imaged according to the illustrated embodiment require a cut at the facing edges (cut edge 108 of the first instance 102 and cut edge 114 of the neighboring instance 104), thus two cuts (i.e., a double cut) are required to separate the instances 102, 104 when imagery 106 extends into the gap 112 between the instances 102, 104.

Many imaging technologies are unable to image instances at the outside edge of the sheet. In some exceptions, the media instances might not require imagery at the edges and may be placed coextensively with an outside edge of the media sheet. Some imaging technologies have the highest quality imaging in the center of the sheet, and therefore it is preferable to have unallocated sheet media placed around the outside edge of the sheet. Generally though, the cutting process of the media sheet often generates scrap media at the outside edges of the media sheet that needs to be trimmed. Preferably, the scrap media should be removed with as few cuts as possible.

In some cases, a cutting sequence of an arrangement of media instances may produce a same number of total cuts. By way of example, an M×N arrangement of instances with aligned edges that are to be cut apart using all single cuts, or all double cuts, would necessitate the same number of total cuts, assuming the outside edges have already been cut, regardless of the sequence or order in which the cuts are performed.

An example of a single cut analysis may take the form of an arrangement of "M" instances wide by "N" instances tall with all instances having edges aligned with neighboring instances that are to be cut apart using single cuts on all edges. A first single cut sequence separates the columns by making M−1 cuts and then each column needs to be cut into instances by making N−1 cuts in each column. Thus, a total number of cuts using the first single cut sequence may be computed as: Total Cuts=(M−1)+(M*(N−1)) which may be simplified to (M*N)−1.

Alternatively, a second single cut sequence separates the rows by making N−1 cuts and then each row needs to be cut to instances by making M−1 cuts in each row. Thus, a total number of cuts using the second single cut sequence may be computed as: Total Cuts=(N−1)+(N*(M−1)) which may be simplified to (M*N)−1. Consequently, using either the first single cut sequence or the second single cut sequence for separating the arrangement of the "M×N" instances results in the same number of total cuts.

An example of a double cut analysis may take the form of an arrangement of "M" instances wide by "N" instances tall with all instances having edges aligned that are to be cut apart using double cuts on all edges. Again, two different cutting sequences may produce the same number of total cuts.

A first double cut sequence separates the columns by making double cuts between each of them, or 2*(M−1) cuts and then each column needs to be cut into instances by making double cuts, or 2*(N−1) cuts in each column. Thus, a total number of cuts using the first double cut sequence may be computed as: Total Cuts=2*(M−1)+(M*(N−1)), which may be simplified to 2*((M*N)−1) cuts.

Alternatively, a second double cut sequence separates the rows by making double cuts between them, or 2*(N−1) cuts and then each row needs to be cut into instances by making double cuts between the instances, or 2*(M−1) cuts in each row. Thus, a total number of cuts using the second double cut sequence may be computed as: 2*(N−1)+(N*2*(M−1)), which may be simplified to 2*((M*N)−1) cuts. Consequently, using either the first double cut sequence or the second double cut sequence for separating the arrangement of the "M×N" instances results in the same number of total cuts.

In contrast to an arrangement cut by all similar cuts, the number of cuts needed for any M×N arrangement of instances with aligned edges that are to be cut apart using a mixture of single cuts and double cuts does depend upon the order of the cuts. Cutting the double cuts first will provide the minimum required number of cuts.

By way of example, an arrangement of "M" instances wide by "N" instances tall may have vertical neighbors double cut and horizontal neighbors single cut. If the single cuts are made first, then it will require M−1 single cuts to separate the columns. And, then each column will require 2*(N−1) cuts to separate the individual instances from the column. Thus, the total number of cuts may be computed as: Total Cuts=(M−1)+(M*2*(N−1)) cuts, which may be simplified to 2*M*N−M−1.

Alternatively, if the double cuts are made first, then it will require 2*(N−1) cuts to separate the rows. And, then each row requires M−1 cuts to separate the individual instances from the row. Thus, the total number of cuts may be computed as: Total Cuts=2*(N−1)+(N*(M−1)) cuts, which may be simplified to N*M+N−2.

Consequently when a mixture of double cuts and single cuts are employed to separate an arrangement of instances, the aforementioned alternative approach provides a fewer number of total cuts because 2*M*N−M−1>=N*M+N−2. This equation simplifies to M*N>=M+N−1. Since "M" and "N" will always be positive integer values this will always be true, thus proving that cutting double cuts first will be optimal over single cuts for an aligned arrangement of instances with aligned edges.

Figure 2:
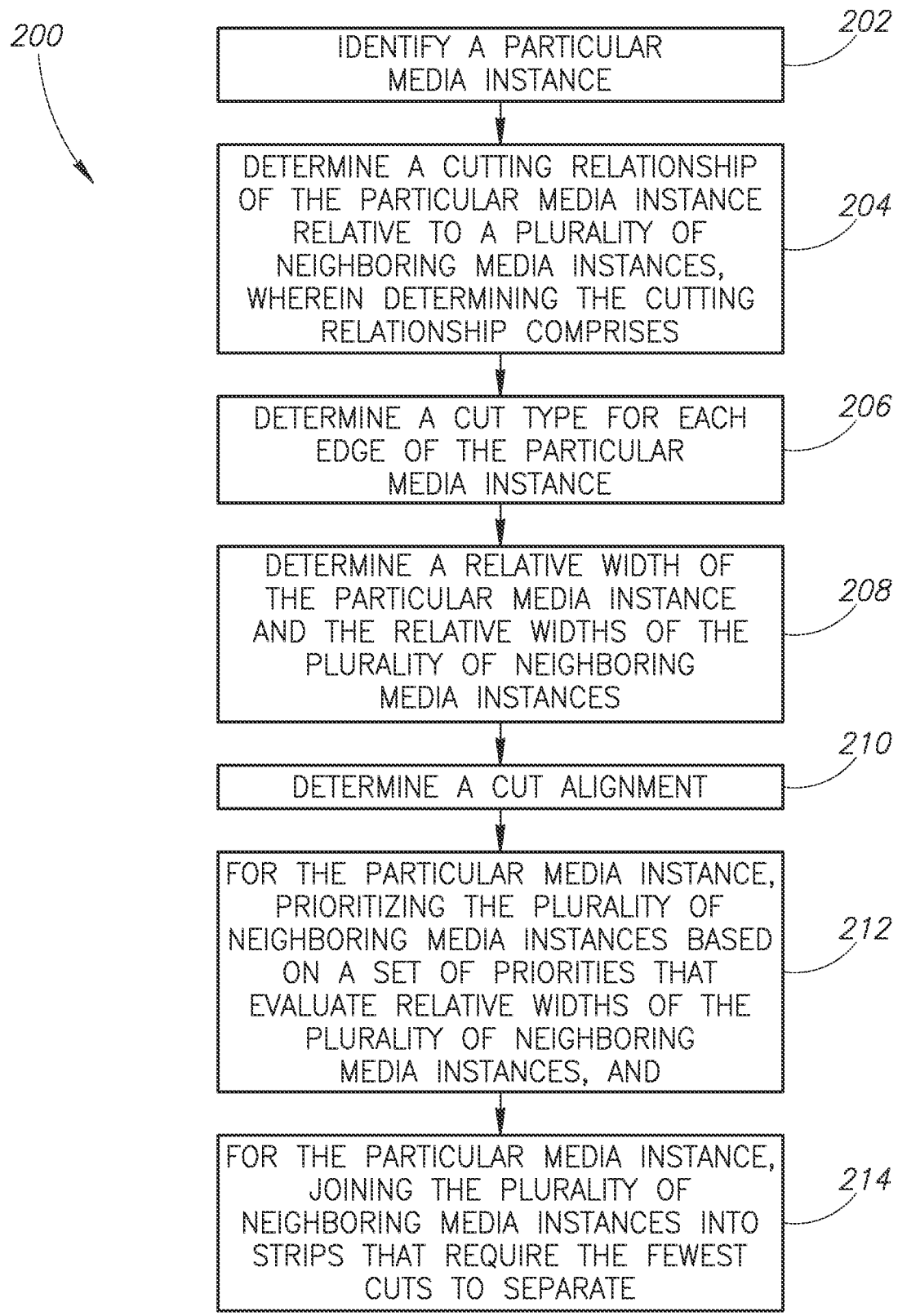
FIG. 2 is a flowchart of a decision process for determining a minimum number of cuts required to separate individual media instances from an imaged media sheet having more than one media instance according to an embodiment of the present invention.

FIG. 2 show a method 200 to determine a number of printing cuts for a plurality of pre-arranged media instances. In one embodiment, the method 200 generally determines a minimum number of cuts required to separate individual media instances from an imaged media sheet having more than one media instance. The media instances are analyzed relative to neighboring instances, prioritized and then collected together into strips. Essentially, the instances may be joined together into strips, and then the strips and/or instances may be joined together into larger strips until all instances are contained in a single strip.

At step 202, a particular media instance is identified or otherwise selected for analysis relative to one or more neighboring media instances. At step 204, a cutting relationship of the particular media instance relative to a plurality of neighboring media instances of the instance is determined. At step 206 and as part of the process for determining the cutting relationship, a cut type (e.g., a single cut or a double cut) for each edge of the particular media instance is determined. At step 208 and further as part of the process for determining the cutting relationship, a relative width of the particular media instance and the relative widths of the plurality of neighboring media instances are determined. At step 210 and further as part of the process for determining the cutting relationship, a cut alignment is determined. At step 212 and for the particular media instance, the plurality of neighboring media instances are weighted or otherwise prioritized based on a set of priorities, rules and/or guidelines that evaluate relative widths of the plurality of neighboring media instances. Lastly at step 214 and for the particular media instance, the plurality of neighboring media instances are joined into strips that require the fewest cuts to separate. These strips may be visually displayed in a layout. The details involved to accomplish the aforementioned method 200 will now be described with respect to FIGS. 3-16.

Figure 3:
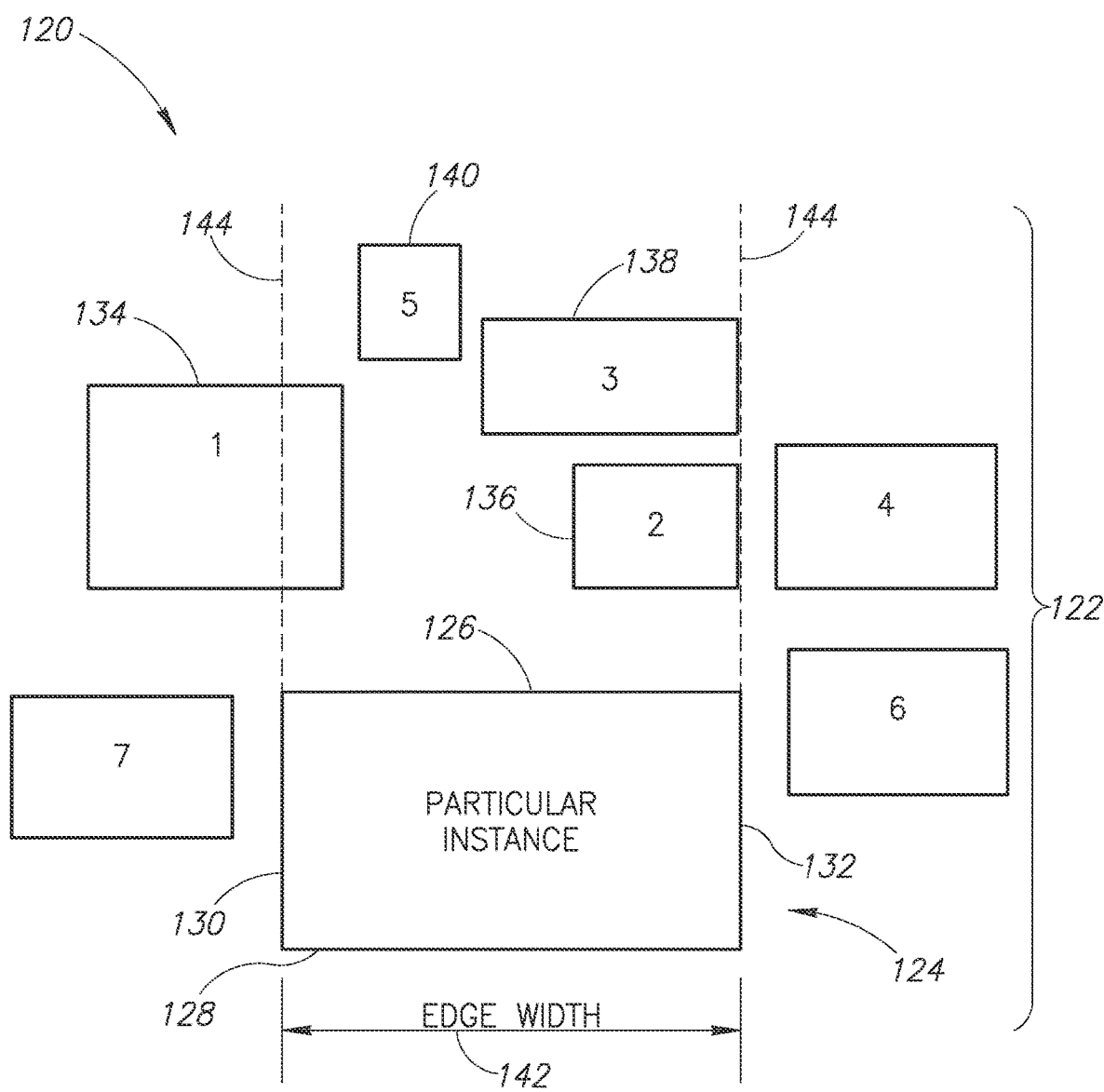
FIG. 3 is a top, perspective view of a particular media instance being analyzed for its relationships to neighboring instances according to an embodiment of the present invention.

The analysis of a layout 120 of media instances 122 considers each instance in the layout individually to determine its relationship with its neighboring instances. Referring to FIG. 3, each instance 122 is cut into a rectangular shape regardless of the final product shape. Thus, each instance 122 has four edges. For simplicity of explanation, regardless of the edge of the instance being considered (top, bottom, left or right) in an un-rotated layout, a particular instance 124 (e.g., the instance being analyzed) is rotated so a top edge 126 may be considered. The method to be described hereinafter may apply to all edges of all instances 122 in the layout 120.

The analysis of the layout 120 may be accomplished using a four step process, which may be summarized as (1) finding the neighboring instances for the particular instance, (2) determining a relationship of the particular instance to the neighboring instances, (3) determining the relative width of the particular instance with its neighboring instances, and (4) checking for double cut situations.

In the first step, the top edge 126, bottom edge 128, left edge 130 and right edge 132 of the particular instance 124 are considered. Each instance 122 in the layout 120 is tested to find all instances that are nearest to the edge being considered, which is the top edge 126 of the particular instance 124 in the illustrated embodiment. In the example shown in FIG. 3 and using the process 125 in FIG. 6, instances 134, 136, 138 and 140 are potential neighbors with the particular instance 124 because they at least partially overlap an extension of an edge width dimension 142 as shown by dashed lines 144. Only the closest potential neighbors are actual neighbors. The closest neighboring instance means that its nearest edge is not farther than the farthest edge of any other potential neighbor. Thus, instance 138 would not be considered a neighbor because the nearest edge of instance 138 is further than the farthest edge of instance 136. Although it is not as obvious with instance 140, the same logic applies, and instance 140 is not considered a neighbor because the nearest edge of instance 140 is further than the farthest edge of any closer neighbor, which in this case is true for both instances 134 and 136.

In the second step and once all neighbors are known for the particular instance 124, the relationship of the particular instance 124 to its neighbors may be determined. Again each edge is considered separately. Determination of relationship of neighbors at this stage determines two aspects of the relationship with neighbors. The first aspect is the cut type needed to separate neighbors (e.g., a single cut, a double cut, or no cut if there is not a neighbor at the edge being considered). If any neighbor is single cut on a given edge, then the edge is considered a single cut edge. The second aspect is the relative width of an instance and its neighbors, as discussed next.

In the third step, determining the relative width of the particular instance 124 and its neighbors is done next. If the edge under consideration of the particular instance 124 has neighbors, then the width of the union of all neighbors to that edge is compared with the extension of the width of the edge of the particular instance 124.

Figure 4:
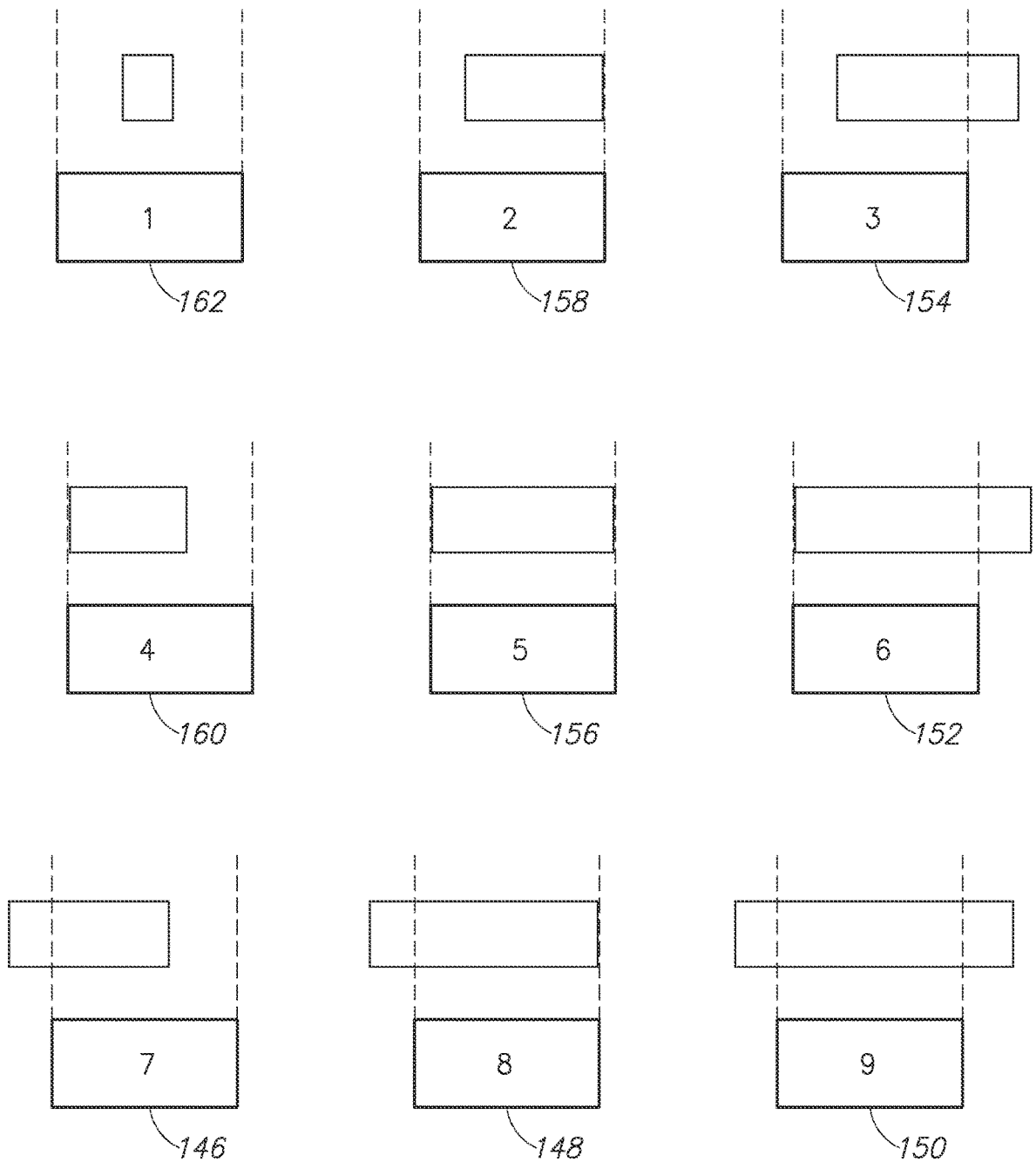
FIG. 4 is a diagram showing different examples of how a width relationship of a particular instance may be evaluated with respect to a neighboring instance according to an embodiment of the present invention.

Each side of the edge of the particular instance 124 has three possible situations. The neighbors can extend beyond the side, be aligned with the side, or be inside of the edge width boundaries. Considering three possibilities for each side gives a total of nine possible relationships, which are illustrated in FIG. 4 and where the instances with numbers inside represent the particular instance 124 from FIG. 3 and the instances above the numbered instances represent a union of all neighbors for the edge being considered of the particular instance.

These nine relationships may be classified into the following four categories based on the impact on cutting. The first category is where one or more neighbors extend beyond the edge width boundaries, and thus the particular instance would be considered to have wider neighbors. From FIG. 4, the first category includes instances 146, 148, 150, 152 and 154.

The second category is when both sides of the edge width boundaries are aligned with the side edges of the neighbor, and thus the particular instance would be considered to have neighboring instance of matching width. This is illustrated by instance 156.

The third category is when no neighboring instances extend beyond the edge width boundaries. At least one side of the edge width boundary does align with a neighboring instance and no neighbors exist in the opposite direction. This is illustrated by instance 158 if no neighbors exist to its left, or by instance 160 if no neighbors exist to its right.

The fourth category is when no neighbors extend beyond the edge width boundaries, and do not have edge alignment that can be categorized by the third category above. This would be instance 162, and possibly instance 158 or instance 160 depending on the location of neighboring instances.

After cut type and neighbors' widths are determined, there is one additional special case that needs to be identified. It is the situation where a double cut with a neighbor of matching width it is important to know if the edges of the double cut are aligned with any neighbors. This is determined by looking to the sides of the particular instance being considered, and to the sides of the neighbors to the edge being considered.

Figure 5:
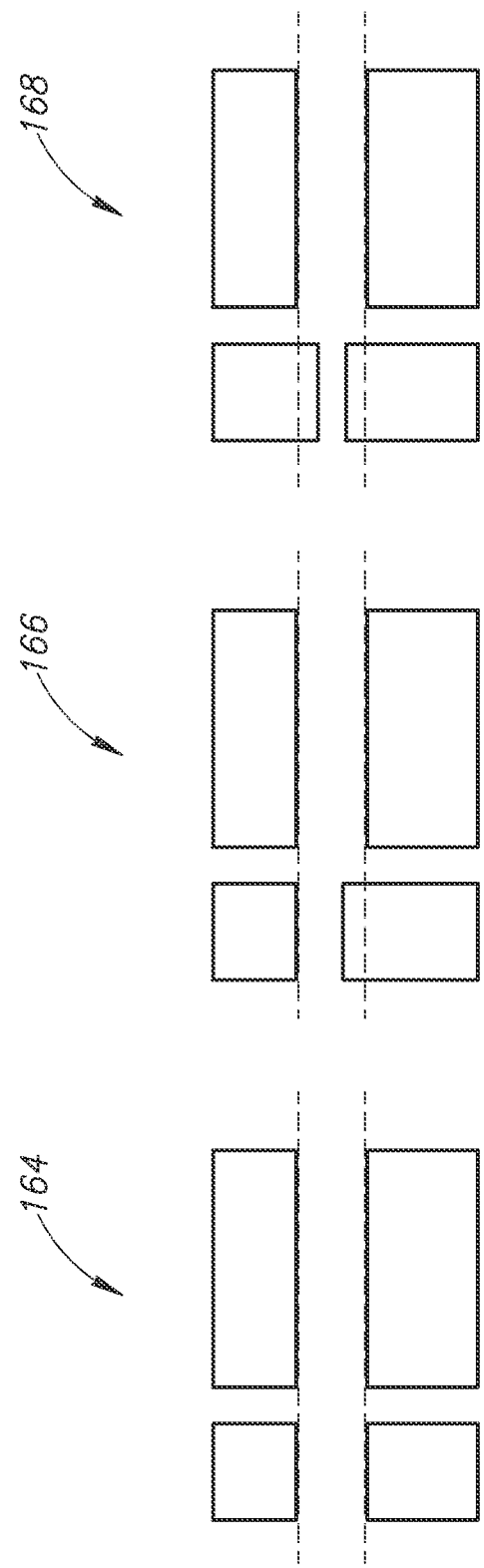
FIG. 5 is a diagram showing different possible alignments of cut edges of a double cut according to an embodiment of the present invention.

There are two different situations of interest. The first situation of interest is whether zero, one or two of the double cut edges are aligned with neighbors. There are two types of misaligned double cuts that need to be considered. The first type of misaligned double cut is illustrated in FIG. 5 by three examples. The first example 164 shows when both cuts are aligned. The second example 166 shows when only one cut is aligned. And the third example shows when no cuts are aligned. The second situation of interest is when the instance being considered has no immediate neighbor as is shown the left case 170 illustrated in FIG. 9 and is also considered to have no cuts aligned, which will be described in more detail later.

Figure 6:
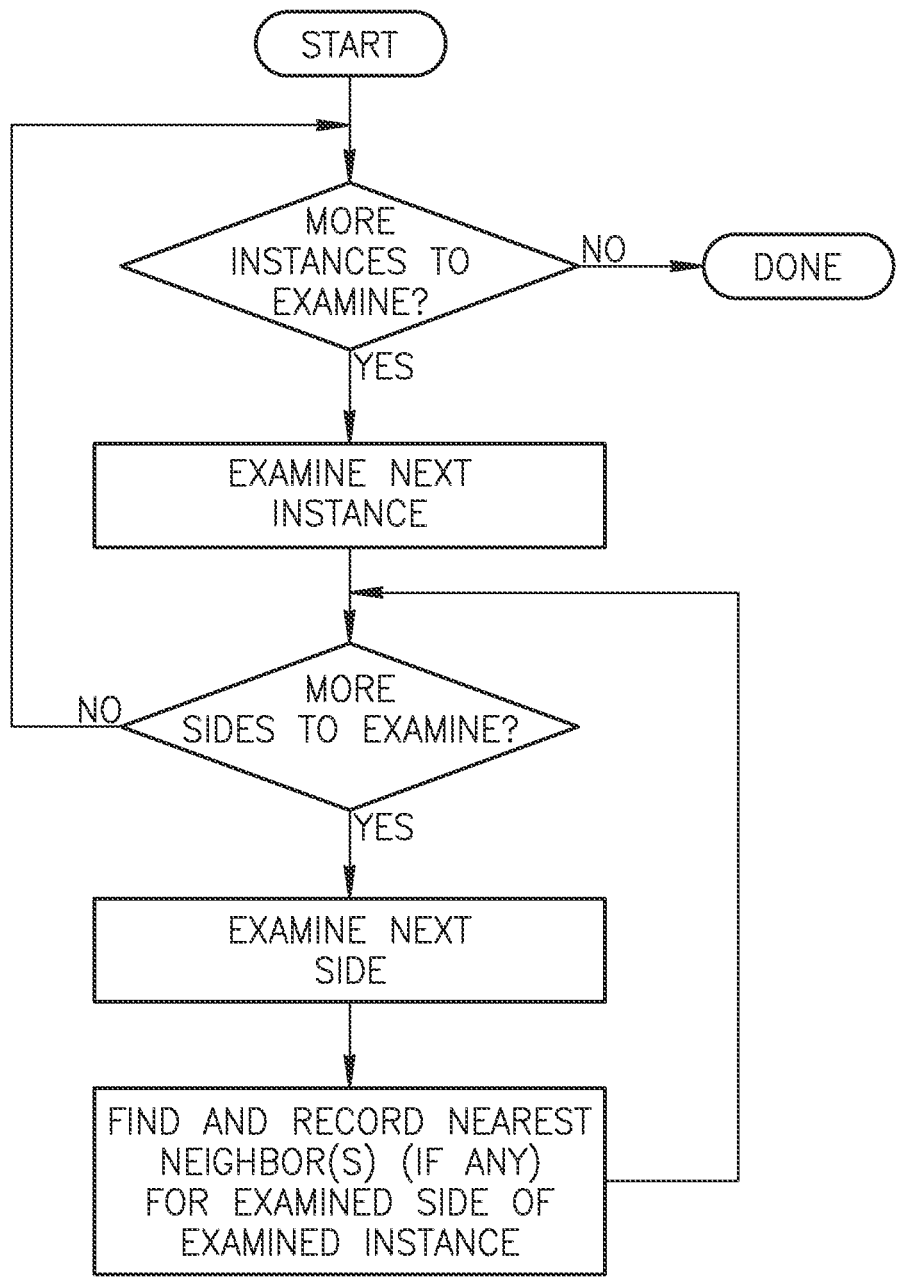
FIG. 6 is a decision process flowchart for finding and recording neighboring instances for a particular instance according to an embodiment of the present invention.
Figure 7A:
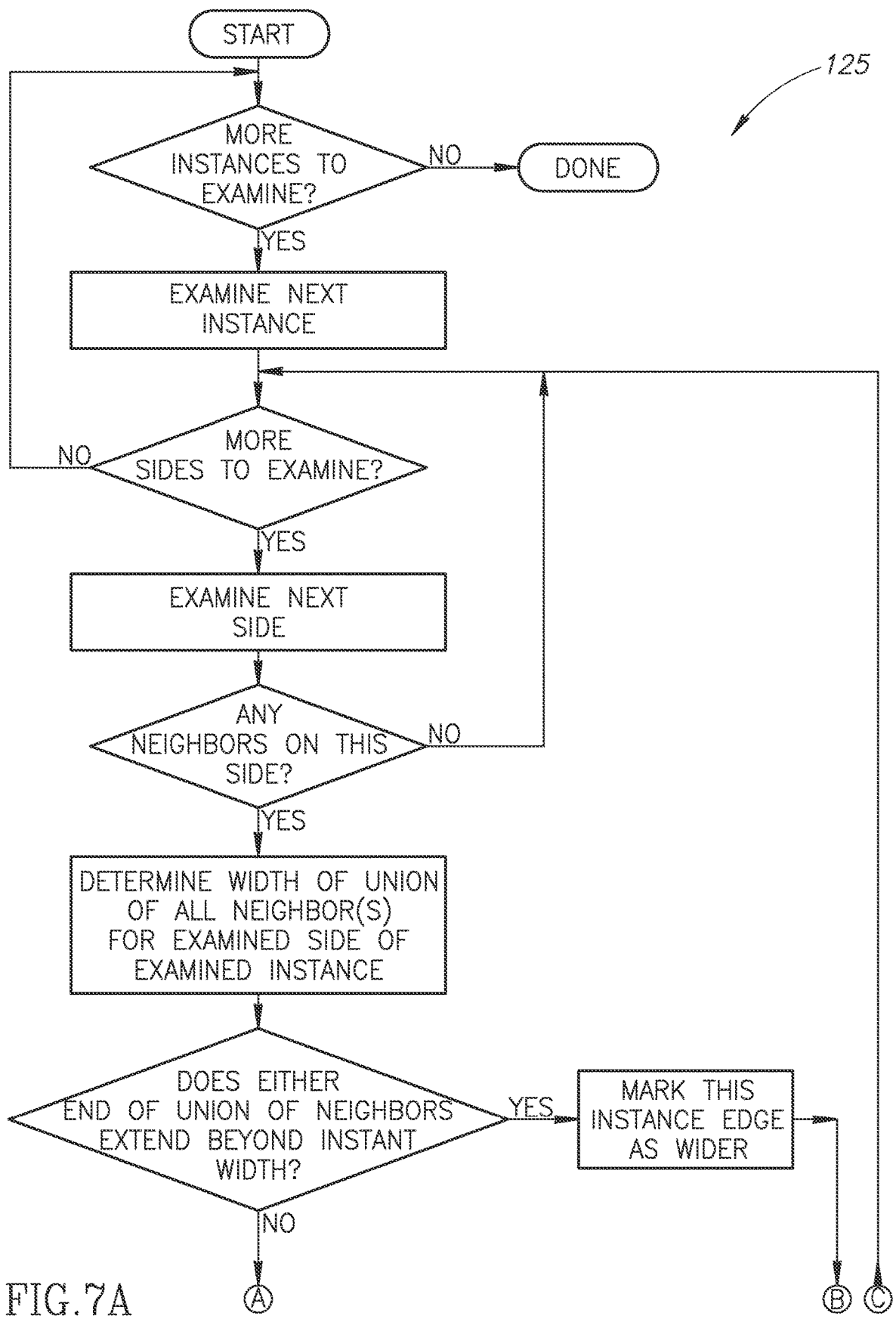
FIGS. 7A and 7B cooperate as a decision process flowchart for determining a relationship of neighboring instances according to an embodiment of the present invention.
Figure 7B:
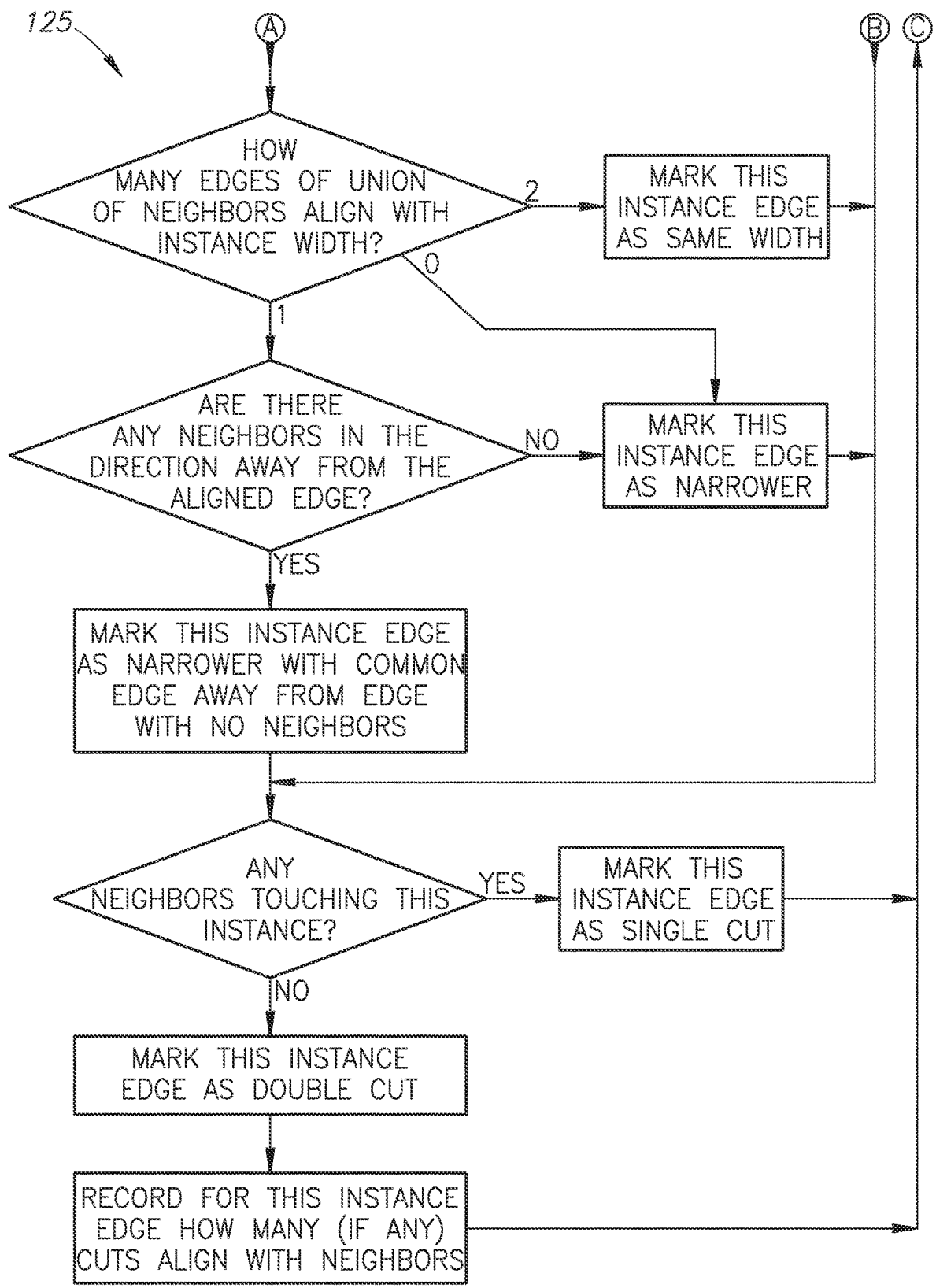
Figure 8A:
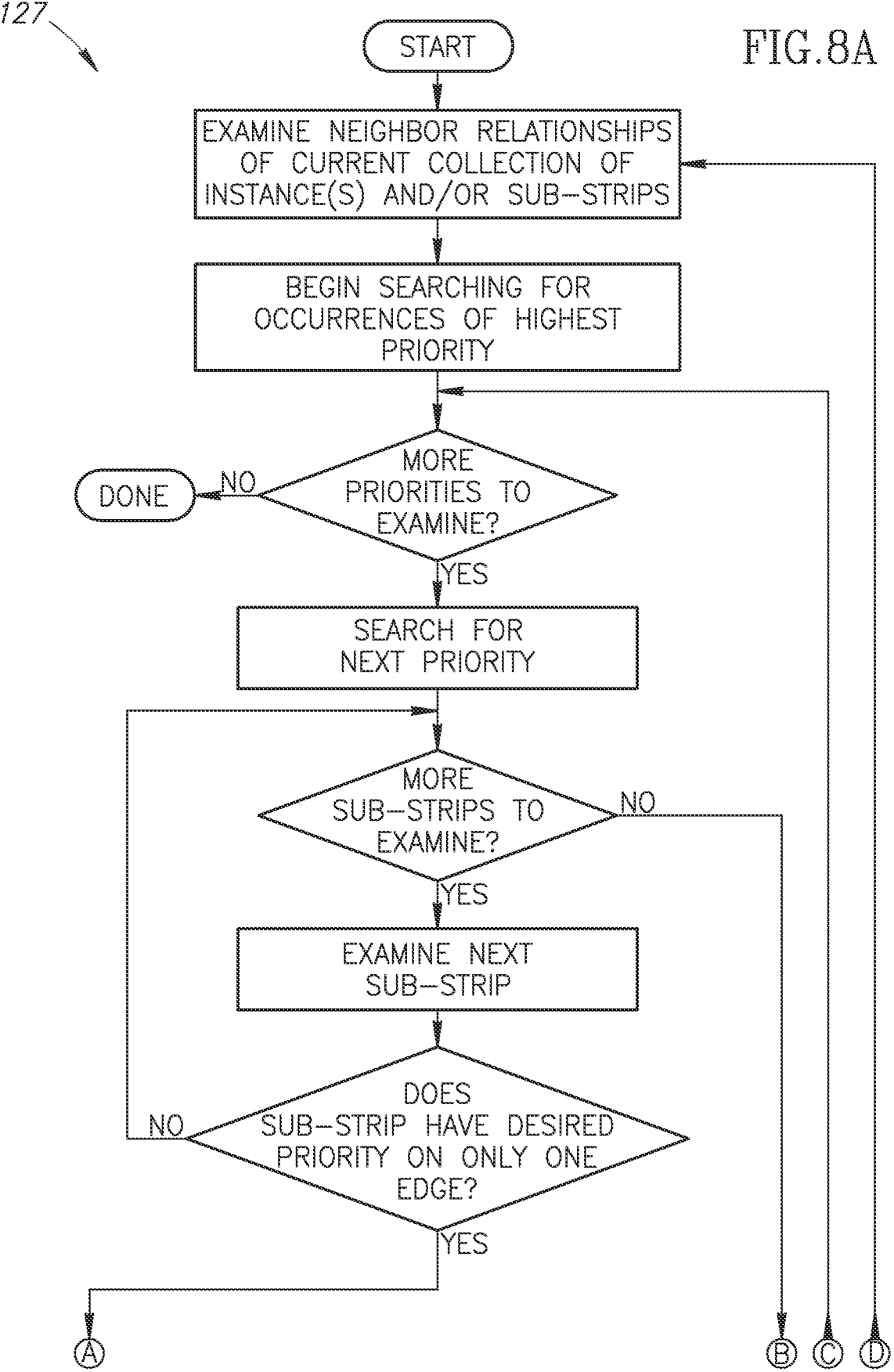
FIGS. 8A and 8B cooperate as a decision process flowchart for joining neighboring instances or sub-strips into larger sub-strips or strips according to an embodiment of the present invention.
Figure 8B:
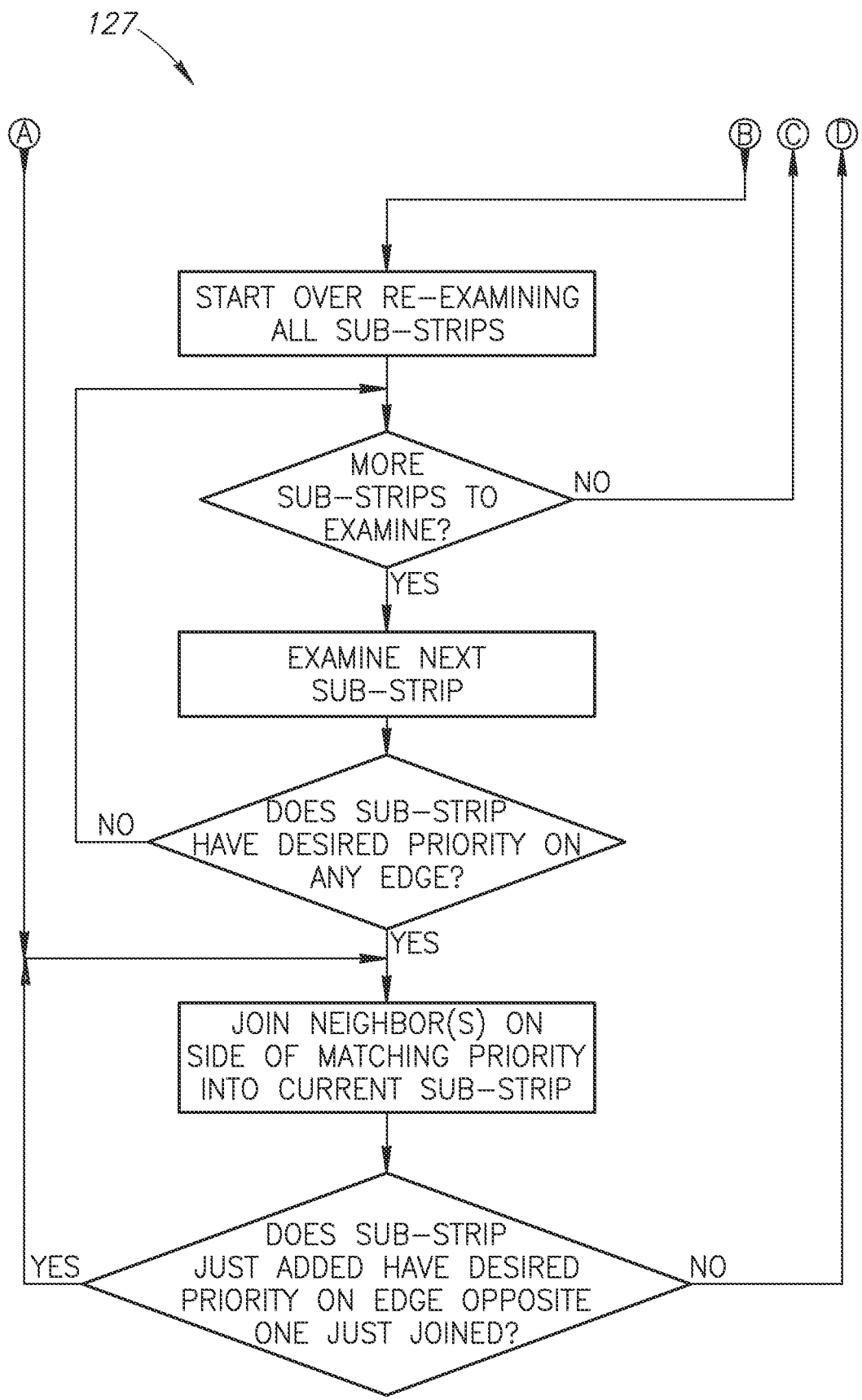

FIG. 6 shows a decision process 123 for finding and recording neighbors for the particular instance 124 (FIG. 3). FIGS. 7A and 7B show a decision process 125 for determining a relationship of neighboring instances.

After all instances in the layout are classified for their neighbor cut type, neighbor width, and cut alignment then instances are combined with neighbors in an order that results in a construction of strips that require the fewest cuts to cut apart. Neighbors are joined into strips using the ten (10) priority rules provided below and using a decision process 127 illustrated in FIGS. 8A and 8B. First, instances with only one neighbor of a given priority are considered. Next, instances with multiple edges matching the given priority are considered because for similarly prioritized cut types it does not matter which orientation is cut first. When joining narrower neighbors, the narrowest neighbor in the layout is joined first, followed by next narrowest neighbors. As neighbors are joined into strips, this new strip may produce a situation with neighbors of higher priority. After neighbors are joined then the highest priority items may be reconsidered. The priority rule in which instances may be joined into strips are, as follows in order from highest to lowest priority.

Priority 1: Neighbors of matching width separated by a double cut with no cuts aligned. Normally, due to the mathematics, double cuts should be performed first, and therefore are used to join strips together last. There is an exception to this priority rule when executing the double cut first would leave one or more untrimmed instance that could be trimmed by cutting the opposite order first. Situations 170 and 172 are illustrated in FIG. 9 where the particular instance 124 is shown relative to its neighboring instances 174.

Figure 9:
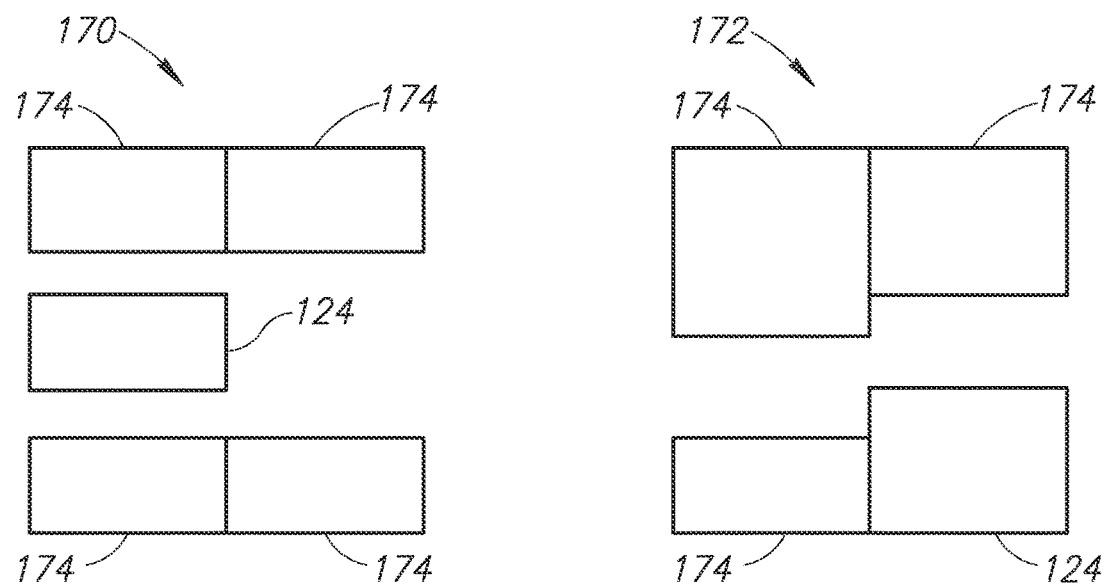
FIG. 9 is a diagram showing a plurality of instances with unaligned double cuts according to an embodiment of the present invention.
Figure 10:
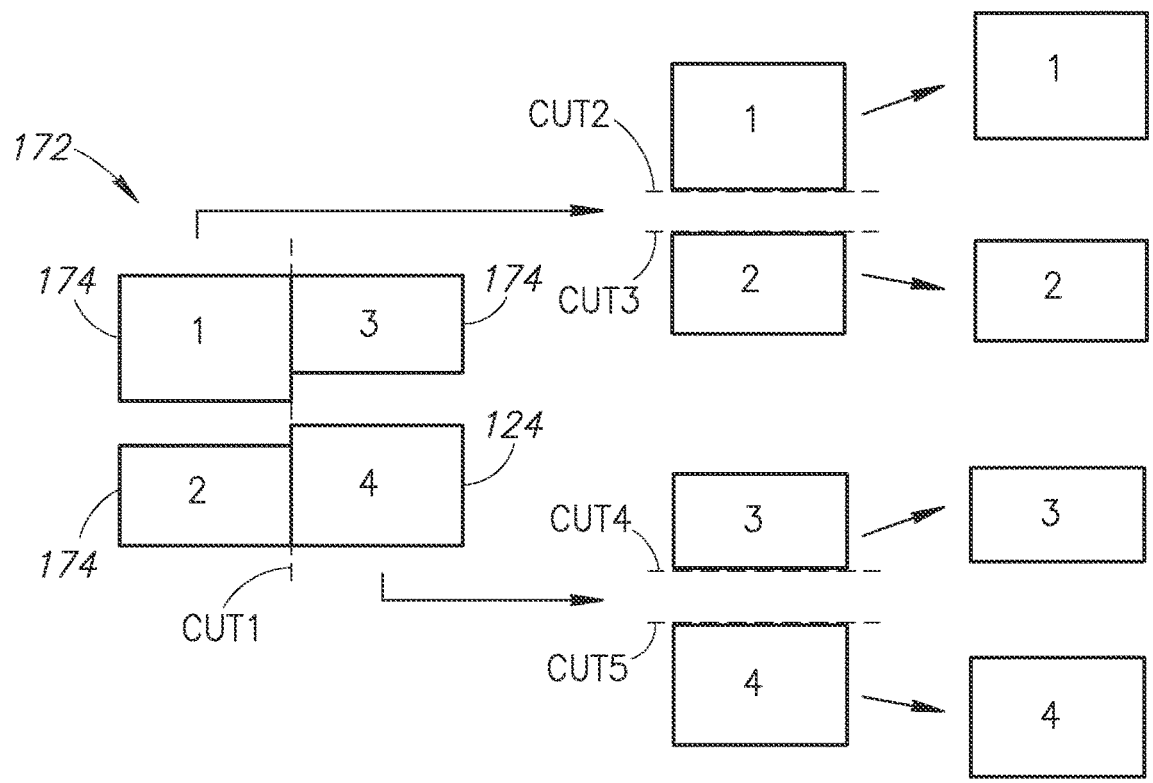
FIG. 10 is a diagram showing an optimal five cut plan for unaligned double cuts according to an embodiment of the present invention.
Figure 11:
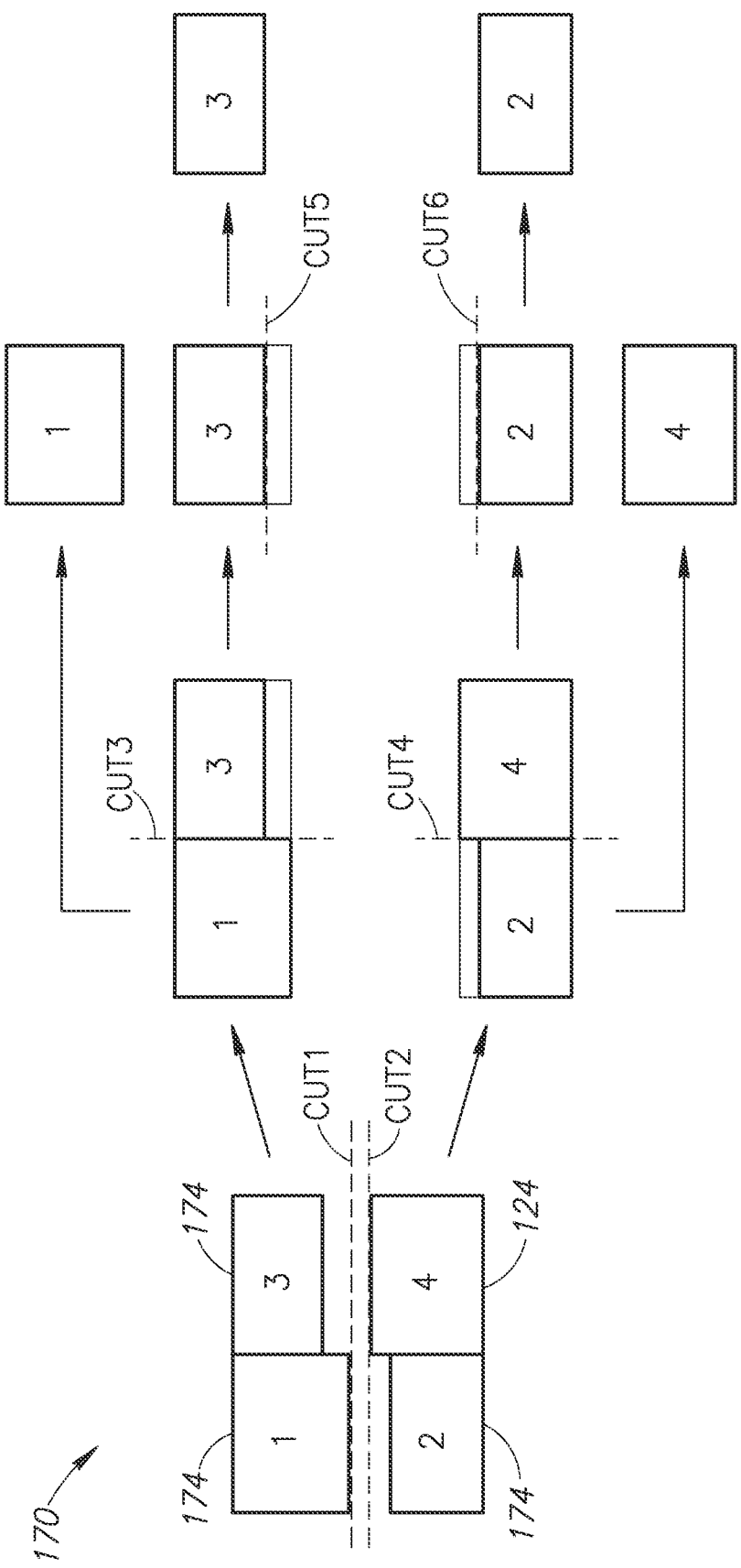
FIG. 11 is a diagram showing a contrasting, sub-optimal six cut plan for the unaligned double cuts from FIG. 10.

FIG. 10 shows an optimal five cut plan for unaligned double cuts using the scenario 172 (FIG. 9). FIG. 11 shows a sub-optimal six cut plan for unaligned double cuts using the scenario (FIG. 9). The contrast illustrates that if single cuts were employed after double cuts, then the cutting process would take six steps, which would be considered to be sub-optimal. For ease of reference, the individual instances are labeled as instances 1, 2, 3 and 4. If single cuts are done first, then it will take five cuts to separate and trim the instances. The respective cuts are labeled as such in FIGS. 10 and 11 respectively.

Priority 2: Neighbors of matching width separated by a single cut. Simply, due to the mathematics of cutting, single cuts should normally be cut last. It would be unlikely for a situation to occur where a single cut separating instances of identical cut edge width will reduce the number of cuts by cutting any earlier.

Figure 12:
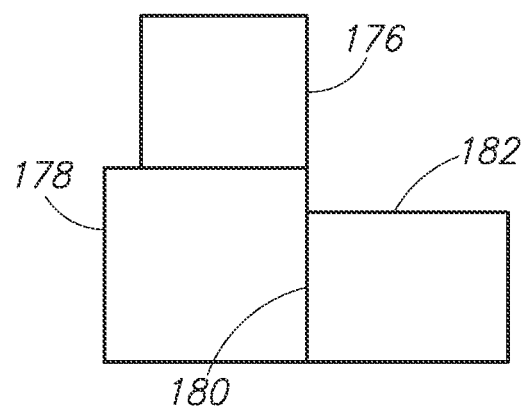
FIG. 12 is a top, plan view of a plurality of instances joined together using one or more priority rules according to an embodiment of the present invention.

Priority 3: Neighbors of smaller width separated by a single cut, if the instances being joined share a common edge toward other neighbors, then the Priority 3 rule deems that the narrowest instances should be joined together first. For non-uniform sized instances there will be circumstances where neighboring instances of different sizes are to be joined. FIG. 12 shows the operation of the Priority 3 rule of joining together narrower neighbors based on alignment. In the illustrated embodiment, it can be seen that instance 176, and instance 178 share a common edge 180 that is facing another neighboring instance 182. A cutting plan for this situation would require a total number of four (4) cuts if instances 176 and 178 are joined first, and then instance 182 is joined later. If instances 178 and 182 are joined first then the cutting plan would require five (5) cuts. When narrower neighbors are joined with a wider instance an intermediate sub-strip is created to contain the narrower neighbor, but is made to be the same width as the instance being considered.

Priority 4: Neighbors of smaller width separated by a single cut, if the instances being joined do not share a common edge toward other neighbors, joining narrowest instances first. For non-uniform sized instances there will be circumstances where neighbors of different size are to be joined. In this case the order that the items are joined can matter. Still referring to FIG. 12, instance 176 and 178 share the common edge 180 that is facing neighboring instance 182. This case will create a cutting plan with a minimum number of four (4) if instances 176 and 178 are joined first, and then instance 182 is joined later. If instances 178 and 182 were joined first then this would result in a minimum of five (5) total cuts to separate the instances. Preferably, instances 176 and 178 should be joined in the Priority 3 step and then instance 182 should be joined in the Priority 4 step. When narrower neighbors are joined with a wider instance an intermediate sub-strip is created to contain the narrower neighbor, but should be made to have the same width as the instance being considered.

Figure 13:
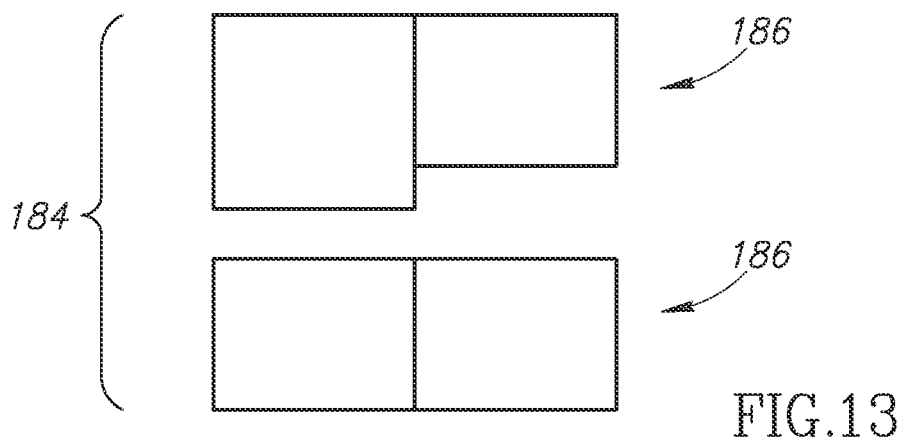
FIG. 13 is a top, plan view of a plurality of instances joined together using one or more priority rules according to an embodiment of the present invention.
Figure 14:
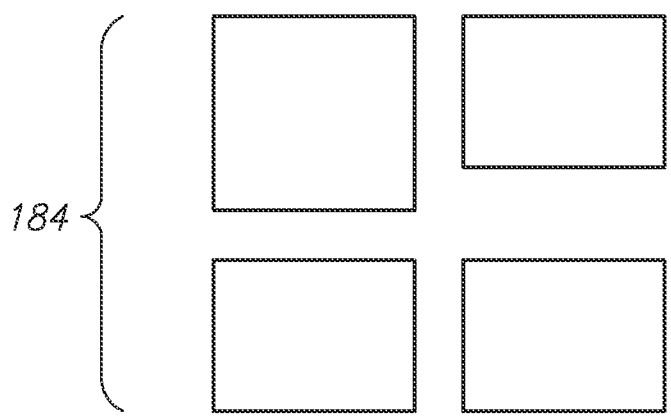
FIG. 14 is a top, plan view of a plurality of instances joined together using one or more priority rules according to an embodiment of the present invention.

Priority 5: Neighbors of matching width separated by a double cut with only one cut aligned. In the situations illustrated in FIGS. 13 and 14, single cuts are actually of equal priority with double cuts that have only one cut aligned, and definitely higher priority for joining instances 184 into strips 186 than double cuts with both cuts aligned. FIG. 13 shows that if the single cut occurs first, then these instances 184 may be separated using five (5) cuts. FIG. 13 also shows that if the double cut occurs first, then these instances 184 may still be separated using five (5) cuts, hence the equal priority. FIG. 14 shows that if the aligned double cut occurs first then these instances 184 may be separated using six (6) cuts. However, if the misaligned double cut occurs first, then these instances 184 would require a minimum of seven (7) cuts to be separated.

Priority 6: Neighbors of matching width separated by a double cut that both cuts make a continuous cut with neighbors. According to the discussion earlier, double cuts should be the first cut done, and therefore are lowest priority for grouping neighbors into strips.

Priority 7: Neighbors of smaller width separated bar a double cut, if the instances being joined share a common edge toward other neighbors, joining narrowest instances first. This is given very low priority to allow all possible matching width neighbors to be joined together into strips before joining neighbors of variable width.

Priority 8: Neighbors of smaller width separated by a double cut, if the instances being joined do not share a common edge toward other neighbors, joining narrowest instances first. This is given very low priority to allow all possible matching width neighbors to be joined together into strips before joining neighbors of narrower width.

Only after all possible strips are constructed using the above eight (8) priority rules then the following two (2) priority rules may be considered:

Priority 9: Wider neighbors separated by a single cut. This priority rule covers the situations where neighboring instances are not aligned on either edge, and neither is narrower than the other. Referring to FIG. 15, the two instances 188 are not aligned on either edge, and thus are not separatable by a single cut. Without the Priority 9 rule, the Priority 10 misaligned, neighboring instances could not be combined into a strip.

Priority 10: Wider neighbors separated by a double cut. Referring to FIG. 16, neighboring instances 190 are not aligned on either edge separated by a double cut. The Priority 10 rule is employed to cover the case where neighboring instances 190 are not aligned on either edge, and neither is narrower than the other.

Joining instances together into strips is effectively the reverse operation of cutting. Therefore it is simple to determine the number of cuts by reversing the order that the strips were joined together. A brief example of this is to consider two instances horizontally next to each other. Joining these instances into a strip produces one strip from the two instances. Cutting is the reverse operation separating the single strip into the two individual instances. As shown in FIG. 10, strips can be formed by aligning multiple instances along a common latitudinal edge. Here, for example, Instances 1 and 3 are aligned along a common latitudinal edge, while Instances 2 and 4 are aligned along a common latitudinal edge. Then, to lessen the number of cuts needed to separate the instances, multiple strips may be aligned along a common longitudinal edge. Here, for example, the longitudinal edge shared by Instances 1 and 3 is aligned with the longitudinal edge shared by Instances 2 and 4. Likewise, instances in a strip may be aligned along a common longitudinal edge, while strips may be aligned along a common latitudinal edge.

Another embodiment of the present invention includes a process for calculating a number of cuts for an aligned arrangement of instances. It is straightforward to identify an arrangement of instances with aligned edges. This is done by comparing the top, bottom, left, and right coordinates of instances with other instances, and making sure that no unaligned instances exist within the bounds of the arrangement. When the arrangement of instances is identified, then calculating the cuts includes applying the mathematical formulas discussed above in the paragraphs preceding the description of FIG. 2 while considering the kinds of cuts used in the arrangement. This process provides a count for the total number of cuts with no need to perform the strip building approach. This process may be used for any arrangement of aligned instances from the smallest grid up to a complete layout of all instances on a sheet. This process may also be used in combination within any other process described herein.

FIG. 17 shows a method 300 for generating a layout for optimal cutting according to yet another embodiment of the present invention. More specifically, FIG. 17 shows the method 300 for optimizing a printing layout to minimize a number of cuts for a plurality of media instances. At step 302, a first subset of the plurality of media instances that have a similar widths are collected together when the plurality of media instances in the first subset may be cut apart from each other with a single cut. At step 304, a first one of the plurality of media instances is joined with the first subset when the first subset has a narrower width and can be cut apart from the first one of the plurality of media instances with the single cut. At step 306, a second subset of the plurality of media instances that have a similar width are collected together when the plurality of media instances in the second subset may be cut apart from each other with a double cut. Lastly at step 308, a second one of the plurality of media instances is joined with the second subset when the second subset has a narrower width and can be cut apart from the second one of the plurality of media instances with the double cut.

Determining the optimal layout for a collection of instances is similar to constructing strips from instances that are in the layout. Instances are categorized based on their height, width, and which instances and edges could be single cut when neighbors. Often instances may be considered for both orientations (swapping height and width), but for some instances rotation may be restricted based on a required relationship between the instance orientation and the substrate orientation (for instance substrate grain direction, or imaging technology restrictions).

Depending on the instance imagery, it is possible to have instances that can be single cut from some neighboring instances and would require a double cut to be separated from other neighboring instances. For neighbors to be single cut, the imagery extending beyond the edge of a particular instance must match the imagery at the edge of the neighboring instance. One example of this would be an instance with a background color that is imaged beyond the instance edge. If two instances share the same background color, then they can be neighbors and single cut apart, whereas two instances with different background colors would require a double cut between them.

Figure 18:
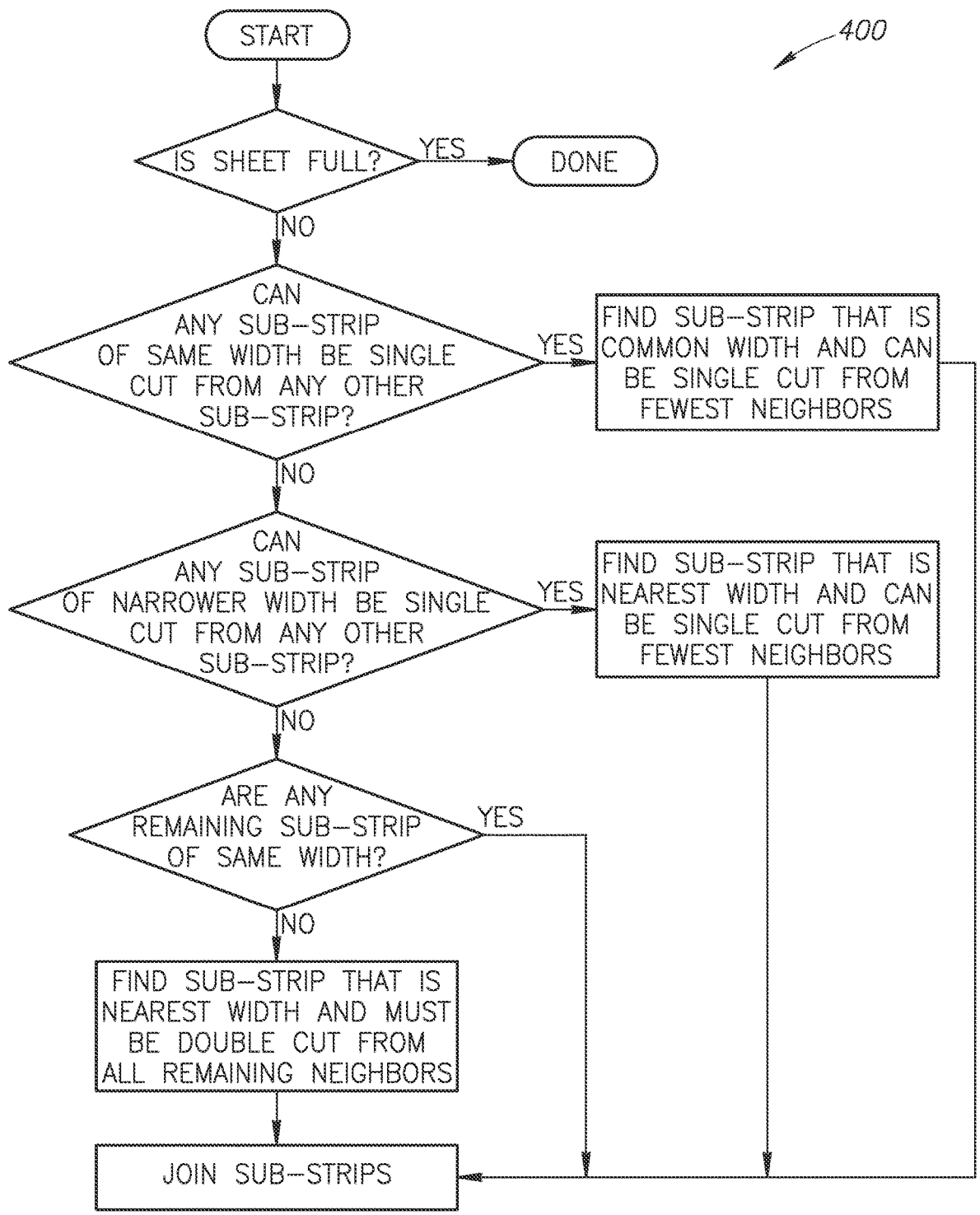
FIG. 18 is a decision process flowchart for combining instances and sub-strips into a layout to minimize a total number of cuts for a media sheet according to an embodiment of the present invention.

In one embodiment, joining individual instances into strips may be accomplished using the following priority rules to minimize or optimize a total number of cuts required to adequately separate the instances. Refer to FIG. 18 for an illustration of a decision process 400 for combining instances and sub-strips into a layout for minimum cutting using the hereinafter described priority rules.

A purpose of a first or a highest priority rule is to eliminate as many unnecessary double cuts required between instances. This is done by putting neighbors together that can be single cut apart, but would need to be double cut apart from other neighbors. When constructing a layout from instances, information about which instances can be single cut when neighboring other instances is considered to produce as many single cuts between neighbors, and reduce the number of double cuts required in a layout. Sub-strips that have the fewest potential neighbors that they can be single cut apart from are joined first. If sub-strips cannot be joined with a single cut, then rotating one or more instances by one-hundred eighty (180) degrees in the sub-strips is tested to determine if it would facilitate joining the sub-strips with a single cut while maintaining the single cut relationship with existing neighbors. Within the context of the first priority rule, a first sub-priority includes joining sub-strips together that are the same width (measured along the common edge) and can be single cut apart, but would require being double cut apart from other neighbors. The same width includes either of the joined sub-strips being able to be expanded to match the width of the other sub-strip. When two or more sub-strips may match width in this way the sub-strip requiring the minimum expansion is chosen.

Still within the context of the first priority rule, a second sub-priority includes joining sub-strips together with one narrower (measured along the common edge) and can be single cut apart, but would require being doable cut apart from other neighbors.

A purpose of a second or a lowest priority rule is to collect as many instances (or strips) as possible that must be cut apart from each other with a double cut. Within the context of the second priority rule, previously joined sub-strips are separated by a double cut when the sub-strips are of equal width when measured along the edge being joined. The same width includes either of the joined sub-strips being able to be expanded to match the width of the other sub-strip. When two or more sub-strips may match width in this way the sub-strip requiring the minimum expansion is chosen.

Still within the context of the second priority rule, sub-strips may be joined together with one narrower (measured along the common edge) and can be single cut apart, but would require being double cut apart from other neighbors. As each sub-strip is joined the process starts over looking for highest priority neighboring sub-strips from among instances yet to be placed and strips already constructed. As sub-strips are joined, length is limited to the remaining unallocated area on the sheet.

Figure 19:
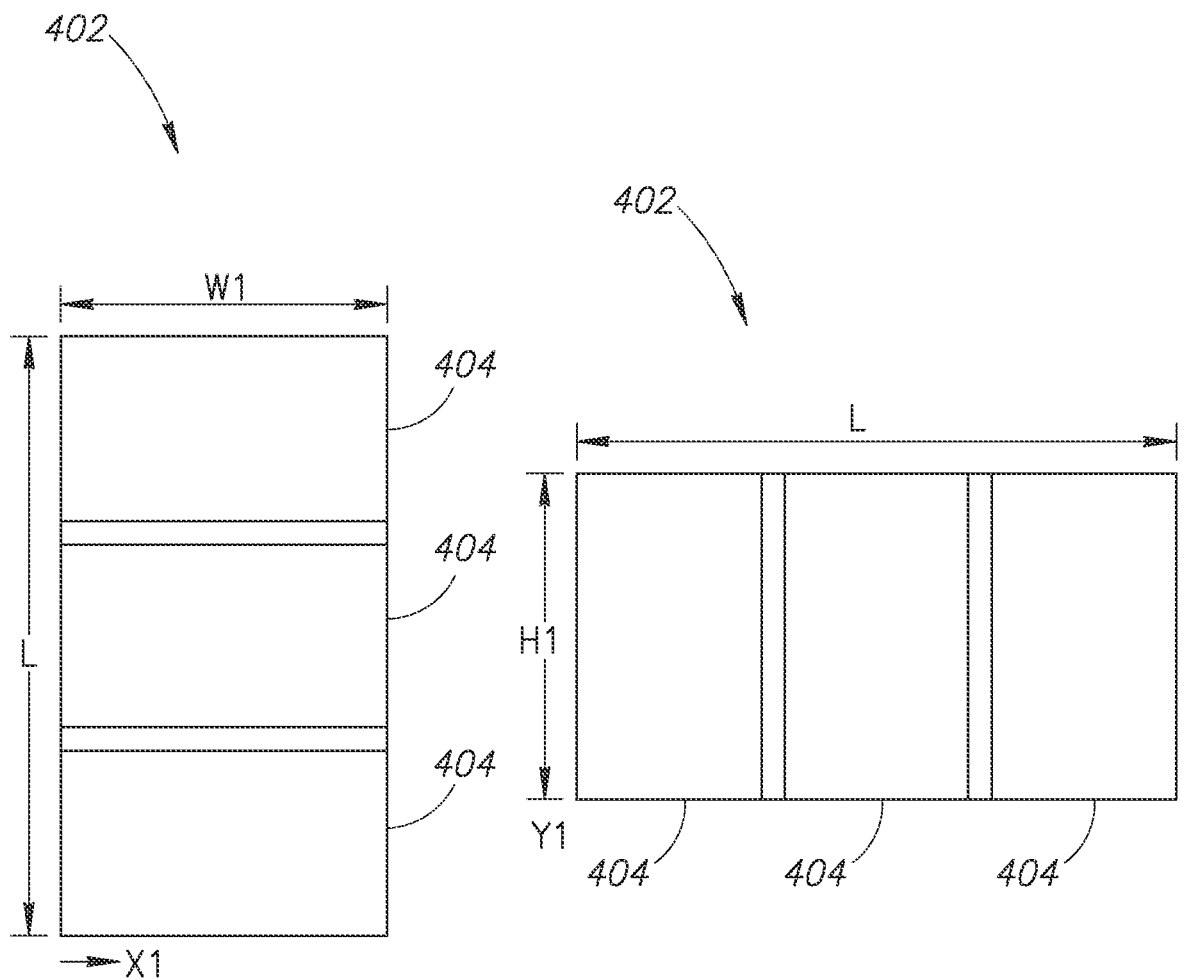
FIG. 19 is a top, plan view of strips constructed as double cut strips with a variable length according to an embodiment of the present invention.

FIG. 19 shows a strip 402 constructed of double cut sub-strips 404, when narrower strips containing double cuts are joined with other strips it may be advantageous to expand a width of one of the double cuts in the strip to match a width of a neighboring instance. This can be done without any additional cuts, and will remove one unnecessary cut from the joined strips.

For all strips having more than a single instance and double cut gutters (i.e., not all single cuts) the "length" of the strip 402 designated by the letter "L" in FIG. 19 becomes a variable because one gutter may be opened up so that a total strip length can match neighboring strips to share a common cut. This will reduce the number of cuts needed for the final layout by one.

Figure 20:
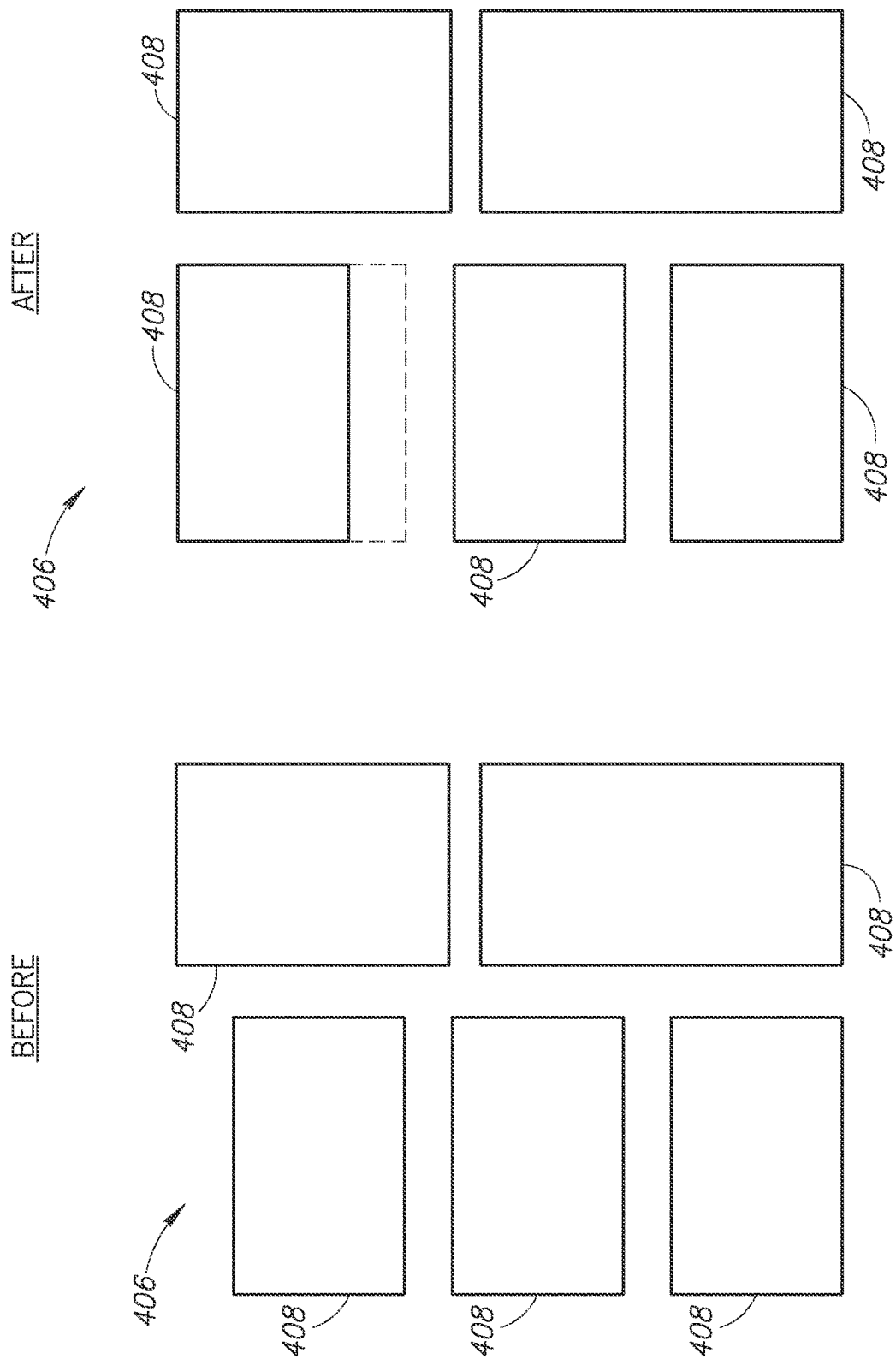
FIG. 20 is a BEFORE and AFTER diagram showing how to move an instance or a sub-strip to align two strips according to an embodiment of the present invention.

FIG. 20 shows a "BEFORE" and "AFTER" view of a layout 406 having a plurality of instances 408 in which a sub-strip may be moved to align two strips.

Instances may have variable internal dimensions to optimize and there are a variety of different kinds of instances. Most instances collected together in a layout to be imaged on a media sheet media are of fixed dimensions based on the final instance. However, some instances may encounter another processing step called bindery-trimming in processing the instance. The bindery-trimming process is a completely different process from cutting and, does not add additional cost, and occurs regardless of the amount to be bindery-trimmed off. These instances that will be bindery-trimmed can have their instance size modified within certain limits dependent upon bindery-trim equipment capabilities. Generally, the two variable internal dimensions for a bindery-trimmed instance are the non-jog, and face trims. These variable dimensions are perpendicular to each other. Therefore, by varying each of them independently each dimensions of the instance may be modified independently.

Generally for a bindery-trimmed instance there will only be one instance placed on the media sheet. In this case, one objective will be to have the instance size match the media sheet size by modifying the variable internal dimensions to produce the desired total instance size. Bindery-trimmed instances can also be placed in multiple sets on the media sheet, in which case another objective will be to have the instance size match the portion of the media sheet allocated to the instance (for example, half or quarter sheet), and therefore require only single cutting the instances apart, but no additional trimming would be required in the cutting process.

The various embodiments described above can be combined to provide further embodiments. U.S. Patent Publication No. 2005/0012961 entitled "Arranging Components on a Sheet" is incorporated herein by reference in its entirety. In addition, any other U.S. patents, patent applications and publications referred to in this specification are also incorporated herein by reference in their entireties. Aspects can be modified, if necessary, to employ devices, features, and concepts of the various patents, applications and publications to provide yet further embodiments.

These and other changes can be made in light of the above detailed description. In general, in the following claims, the terms used should not be construed to limit the invention to the specific embodiments disclosed in the specification and the claims, but should be construed to include all types of media imaging, media cutting and media processing that operate in accordance with the claims. Accordingly, the invention is not limited by the disclosure, but instead its scope is to be determined entirely by the following claims.

The invention claimed is:

1. A computer-implemented method performed by a computing system to lessen a number of cuts needed by a cutting device to separate media instances printed on a substrate, the method comprising:
   identifying, by the computing system, a first pair of media instances that have a similar width but different heights;
   forming, by the computing system, a first strip by aligning the first pair of media instances along a common longitudinal edge;
   identifying, by the computing system, a second pair of media instances that have a similar width but different heights;
   forming, by the computing system, a second strip by aligning the second pair of media instances along a common longitudinal edge; and
   arranging, by the computing system, the first and second strips so that a latitudinal edge of the first pair of media instances is aligned with a latitudinal edge of the second pair of media instances.

2. The computer-implemented method of claim 1, wherein the first pair of media instances is separable along a shared edge by a single cut.

3. The computer-implemented method of claim 1, wherein the second pair of media instances is separable along a shared edge by a single cut.

4. The computer-implemented method of claim 1, wherein the common longitudinal edge of the first pair of media instances is shared with the common longitudinal edge of the second pair of media instances to enable separation of the first and second pairs of media instances by a single cut.

5. The computer-implemented method of claim 1, wherein the width of the first pair of media instances is different than the width of the second pair of media instances.

6. The computer-implemented method of claim 1, further comprising:
   shifting a first media instance of the first pair of media instances to cause alignment of a second latitudinal edge of the first pair of media instances with a second latitudinal edge of the second pair of media instances.

7. The computer-implemented method of claim 6, wherein said shifting causes a gap to be established between the first pair of media instances.

8. The computer-implemented method of claim 1, further comprising:
   finalizing a layout that includes the first and second strips; and
   causing the first and second pairs of media instances to be printed on a substrate in accordance with the layout.

9. The computer-implemented method of claim 1, wherein the first pair of media instances are joined along the common longitudinal edge of the first strip, and wherein the second pair of media instances are joined along the common longitudinal edge of the second strip.

10. A system able to lessen a number of cuts needed by a cutting device to separate media instances printed on a substrate, the system comprising:
    a computing system configured to—
      identify a first pair of media instances that have a similar width but different heights;
      form a first strip by aligning the first pair of media instances along a common longitudinal edge;
      identify a second pair of media instances that have a similar width but different heights;
      form a second strip by aligning the second pair of media instances along a common longitudinal edge;
      arrange the first and second strips so that a latitudinal edge of the first pair of media instances is aligned with a latitudinal edge of the second pair of media instances;
      finalize a layout that includes the first and second strips; and
      cause the first and second pairs of media instances to be printed on a substrate in accordance with the layout; and
    a cutting device configured to—
      cut the first pair of media instances from the second pair of media instances;
      cut the first pair of media instances apart from one another; and
      cut the second pair of media instances apart from one another.

11. The system of claim 10, wherein the cutting device is further configured to—
    cut the first and second pairs of media instances from excess substrate with a single cut along the shared latitudinal edge.

12. The system of claim 10, wherein the first pair of media instances is separable from the second pair of media instances with a double cut.

13. The system of claim 10, wherein the width of the first pair of media instances is different than the width of the second pair of media instances.

* * * * *